(12) United States Patent
Hirakawa

(10) Patent No.: US 12,436,362 B2
(45) Date of Patent: Oct. 7, 2025

(54) IMAGING LENS AND IMAGING APPARATUS

(71) Applicant: FUJIFILM Corporation, Tokyo (JP)

(72) Inventor: Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 563 days.

(21) Appl. No.: 17/850,771

(22) Filed: Jun. 27, 2022

(65) Prior Publication Data

US 2023/0003969 A1    Jan. 5, 2023

(30) Foreign Application Priority Data

Jul. 2, 2021 (JP) ................................. 2021-110778
Sep. 21, 2021 (JP) ................................. 2021-153577

(51) Int. Cl.
G02B 9/12    (2006.01)
(52) U.S. Cl.
CPC ...................................... G02B 9/12 (2013.01)
(58) Field of Classification Search
CPC . G02B 9/12; G02B 9/64; G02B 13/02; G02B 15/143103; G03B 5/02; G03B 17/14; G03B 30/00
See application file for complete search history.

(56) References Cited

U.S. PATENT DOCUMENTS

| | | | | |
|---|---|---|---|---|
| 2009/0201585 A1* | 8/2009 | Yasui | ...................... | G02B 13/02 359/558 |
| 2010/0231781 A1* | 9/2010 | Lee | ...................... | G02B 13/02 348/E5.045 |
| 2017/0351059 A1 | 12/2017 | Gyoda et al. | | |
| 2019/0064487 A1* | 2/2019 | Kondo | ................. | G02B 27/005 |
| 2020/0026047 A1 | 1/2020 | Hosoi et al. | | |
| 2020/0257129 A1 | 8/2020 | Saito | | |

FOREIGN PATENT DOCUMENTS

| | | |
|---|---|---|
| JP | H10-020193 A | 1/1998 |
| JP | 2016-161644 A | 9/2016 |
| JP | 2017-215491 A | 12/2017 |
| JP | 2017-215493 A | 12/2017 |
| JP | 2020-134536 A | 8/2020 |
| JP | 2020-173350 A | 10/2020 |
| JP | 2020-187321 A | 11/2020 |
| JP | 2021-039379 A | 3/2021 |
| WO | 2018/088038 A1 | 5/2018 |

OTHER PUBLICATIONS

An Office Action; "Notice of Reasons for Refusal," mailed by the Japanese Patent Office on Jul. 29, 2025, which corresponds to Japanese Patent Application No. 2021-153577 and is related to U.S. Appl. No. 17/850,771; with English language translation.

* cited by examiner

Primary Examiner — Thomas K Pham
Assistant Examiner — Justin W. Hustoft
(74) Attorney, Agent, or Firm — Studebaker Brackett PLLC

(57) ABSTRACT

The imaging lens consists of, in order from the object side, a first lens group that has a positive refractive power, a stop, a second lens group that has a positive refractive power, and a third lens group that has a negative refractive power. During focusing, the first lens group and the third lens group remain stationary with respect to the image plane, and the second lens group moves along the optical axis. The imaging lens satisfies predetermined conditional expressions.

23 Claims, 21 Drawing Sheets

EXAMPLE 1

FIG. 2
EXAMPLE 1
INFINITY
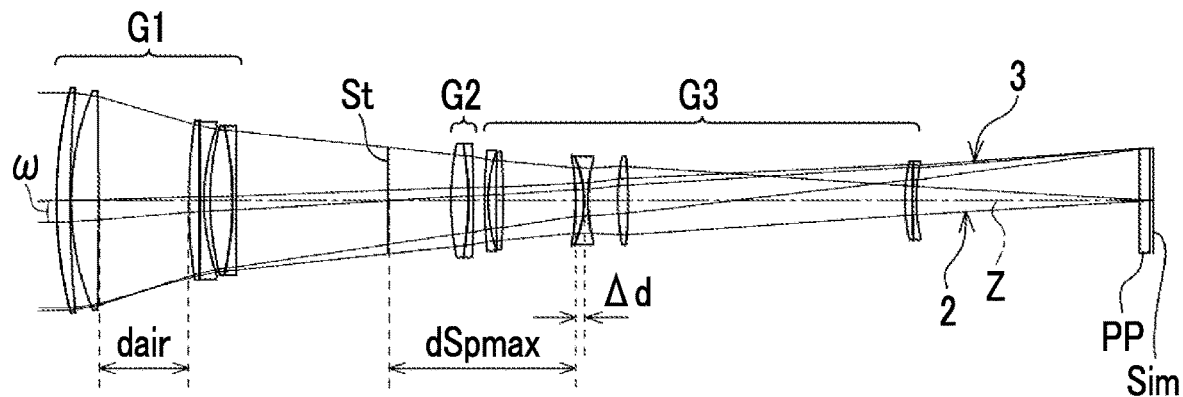
CLOSEST
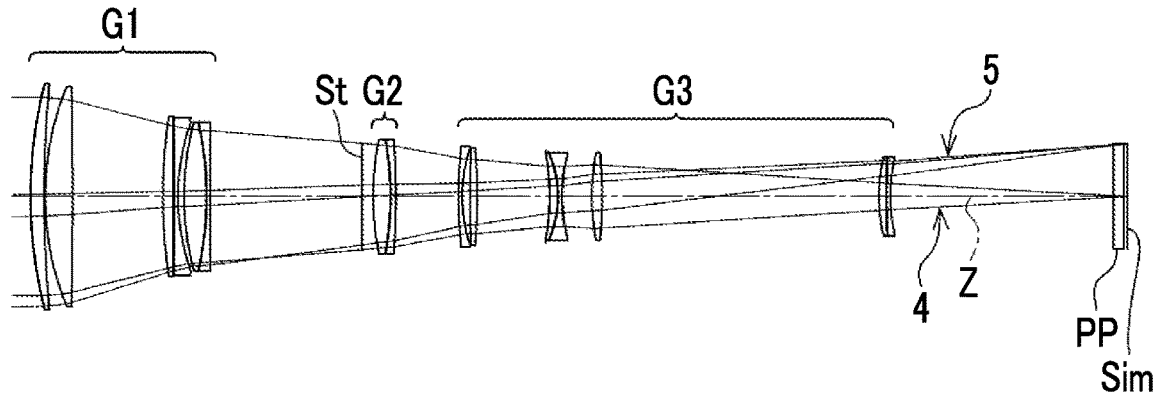

EXAMPLE 2

EXAMPLE 3

EXAMPLE 5

EXAMPLE 6

EXAMPLE 8

EXAMPLE 9

IMAGING LENS AND IMAGING APPARATUS

CROSS-REFERENCE TO RELATED APPLICATIONS

The present application claims priority under 35 U.S.C. § 119 to Japanese Patent Application No. 2021-110778, filed on Jul. 2, 2021 and Japanese Patent Application No. 2021-153577, filed on Sep. 21, 2021. Each application above is hereby expressly incorporated by reference, in its entirety, into the present application.

BACKGROUND

Technical Field

A technique of the present disclosure relates to an imaging lens and an imaging apparatus.

Related Art

In the related art, as an imaging lens applicable to an imaging apparatus such as a digital camera and a video camera, for example, the lens systems described in JP2020-134536A, JP2016-161644A, WO2018/088038A, and JP2021-039379A are known.

In recent years, there has been a demand for a telephoto type imaging lens that has a small size, a light weight, and favorable optical performance.

SUMMARY

The present disclosure has been made in view of the above-mentioned circumstances, and an object of the present invention is to provide a telephoto type imaging lens which has a small size, a light weight, and favorable optical performance, and an imaging apparatus comprising the imaging lens.

According to an aspect of the present disclosure, there is provided an imaging lens consisting of, in order from an object side to an image side: a first lens group that has a positive refractive power; a stop; a second lens group that has a positive refractive power; and a third lens group that has a negative refractive power. During focusing, the first lens group and the third lens group remain stationary with respect to an image plane, and the second lens group moves along an optical axis. Assuming that a sum of a distance on the optical axis from a lens surface closest to the object side in the first lens group to a lens surface closest to the image side in the third lens group and a back focal length of a whole system in terms of an air conversion distance is TL, a focal length of the whole system in a state in which an infinite distance object is in focus is f, a focal length of the first lens group is f1, a maximum half angle of view in a state in which the infinite distance object is in focus is ω, and a unit of ω is degree, Conditional Expressions (1), (2), and (3) are satisfied, which are represented by $$0<TL/f<0.64 \tag{1},$$

$$1.5<f/f1<5 \tag{2, and}$$

$$0<\omega<4 \tag{3}.$$

It is preferable that the first lens group includes a diffractive optical surface. Assuming that a distance on the optical axis from the diffractive optical surface to the stop is dDOE, Conditional Expression (4) is satisfied, which is represented by $$0.1<dDOE/TL<0.5 \tag{4}.$$

It is preferable that two or more positive lenses are continuously disposed in order from a position closest to the object side in the first lens group.

Assuming that a focal length of the second lens group is f2, it is preferable that the imaging lens according to the above-mentioned aspect satisfies Conditional Expression (5), which is represented by $$0<f/f2<6 \tag{5}.$$

Assuming that a focal length of the third lens group is f3, it is preferable that the imaging lens according to the above-mentioned aspect satisfies Conditional Expression (6), which is represented by $$-30<f/f3<0 \tag{6}.$$

Assuming that a distance on the optical axis between an object side surface of a positive lens having a strongest refractive power among positive lenses disposed closer to the image side than the stop and an object side surface of a negative lens having a strongest refractive power among negative lenses disposed closer to the image side than the stop is Δd, it is preferable that the imaging lens according to the above-mentioned aspect satisfies Conditional Expression (7), which is represented by $$0<\Delta d/TL<0.3 \tag{7}.$$

It is more preferable that the imaging lens according to the above-mentioned aspect satisfies Conditional Expression (7-1), which is represented by $$0<\Delta d/TL<0.25 \tag{7-1}.$$

Assuming that a distance on the optical axis from the stop to an object side surface of a positive lens having a strongest refractive power among positive lenses disposed closer to the image side than the stop is dSpmax, it is preferable that the imaging lens according to the above-mentioned aspect satisfies Conditional Expression (8), which is represented by $$0.05<dSp\,max/TL<0.6 \tag{8}.$$

Assuming that a longest air spacing on the optical axis in the first lens group is dair, it is preferable that the imaging lens according to the above-mentioned aspect satisfies Conditional Expression (9), which is represented by $$0.01<dair/TL<0.25 \tag{9}.$$

It is preferable that the first lens group consists of, in order from the object side to the image side, a first A lens group that has a positive refractive power and a first B lens group that has a negative refractive power and is separated from the first A lens group through the longest air spacing on the optical axis in the first lens group. In such a configuration, assuming that a focal length of the first A lens group is f1A and a focal length of the first B lens group is f1B, it is preferable that the imaging lens according to the above-mentioned aspect satisfies Conditional Expression (10), which is represented by $$-2.5<f1A/f1B<0 \tag{10}.$$

In the configuration in which the first lens group includes the above-mentioned first A lens group and the first B lens group, it is preferable that the first B lens group includes a first lens pair consisting of a positive lens and a negative lens adjacent to each other. Assuming that an Abbe number of the positive lens of the first lens pair based on a d line is ν1Bp, it is preferable that the imaging lens according to the above-mentioned aspect satisfies Conditional Expression (11), which is represented by $$40<\nu 1Bp<100 \tag{11}$$

It is preferable that the third lens group consists of, in order from the object side to the image side, a third A lens group and a third B lens group that is separated from the third A lens group through a longest air spacing on the optical axis in the third lens group. In such a configuration, it is preferable that the third A lens group includes two or more negative lenses and two or more positive lenses. Further, assuming that a focal length of the third A lens group is f3A and a focal length of the third B lens group is f3B, it is preferable that the imaging lens according to the above-mentioned aspect satisfies Conditional Expression (12), which is represented by $$-0.3<f3A/f3B<4 \tag{12}$$

It is preferable that the third lens group includes a vibration-proof group that moves in a direction intersecting with the optical axis during image blur correction. Assuming that a focal length of the vibration-proof group is fis, it is preferable that the imaging lens according to the above-mentioned aspect satisfies Conditional Expression (13), which is represented by $$2.5<f/|fis|<30 \tag{13}$$

It is preferable that the third lens group includes a rear group that has a positive refractive power closer to the image side than the vibration-proof group. Assuming that a focal length of the rear group is fr, it is preferable that the imaging lens according to the above-mentioned aspect satisfies Conditional Expression (14), which is represented by $$2.5<f/fr<25 \tag{14}$$

In a case where one lens component is one single lens or one cemented lens, a lens component that has a negative refractive power is disposed between the second lens group and the vibration-proof group. Assuming that a refractive index of a negative lens included in the lens component that has a negative refractive power at a d line is N3Cn, it is preferable that the imaging lens according to the above-mentioned aspect satisfies Conditional Expression (15), which is represented by $$1.75<N3Cn<2.2 \tag{15}$$

It is preferable that the vibration-proof group includes a second lens pair consisting of a positive lens and a negative lens adjacent to each other. Then, assuming that a refractive index of the positive lens of the second lens pair at a d line is N3p, a refractive index of the negative lens of the second lens pair at the d line is N3n, an Abbe number of the positive lens of the second lens pair based on the d line is ν3p, an Abbe number of the negative lens of the second lens pair based on the d line is ν3n, a partial dispersion ratio of the positive lens of the second lens pair between a g line and an F line is θ3p, and a partial dispersion ratio of the negative lens of the second lens pair between the g line and the F line is θ3n, it is preferable that the imaging lens according to the above-mentioned aspect satisfies Conditional Expressions (16), (17), and (18), which are represented by $$-0.15<N3p-N3n<0.5 \tag{16}$$

$$-40<\nu 3p-\nu 3n<-5 \tag{17), and}$$

$$0<\theta 3p-\theta 3n<0.1 \tag{18}$$

It is preferable that the second lens group includes a third lens pair consisting of a positive lens and a negative lens adjacent to each other. In such a configuration, assuming that a refractive index of the positive lens of the third lens pair at a d line is N2p, a refractive index of the negative lens of the third lens pair at the d line is N2n, an Abbe number of the positive lens of the third lens pair based on the d line is ν2p, an Abbe number of the negative lens of the third lens pair based on the d line is ν2n, a partial dispersion ratio of the positive lens of the third lens pair between a g line and an F line is θ2p, and a partial dispersion ratio of the negative lens of the third lens pair between the g line and the F line is θ2n, it is preferable that the imaging lens according to the above-mentioned aspect satisfies Conditional Expressions (19), (20), and (21), which are represented by $$-0.6<N2p-N2n<0 \tag{19}$$

$$-10<\nu 2p-\nu 2n<30 \tag{20), and}$$

$$-0.15<\theta 2p-\theta 2n<0.1 \tag{21}$$

Assuming that a back focal length of the whole system in terms of an air conversion distance is Bf, it is preferable that the imaging lens according to the above-mentioned aspect satisfies Conditional Expression (22), which is represented by $$1.5<Bf/(f\times \tan \omega)<10 \tag{22}$$

According to another aspect of the present disclosure, there is provided an imaging apparatus comprising the imaging lens of the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "group that has a positive refractive power" means that the entire group has a positive refractive power, and the term "group that has a negative refractive power" means that the entire group has a negative refractive power. Similarly, the term "lens component that has a positive refractive power" means that the lens component as a whole has a positive refractive power, and the term "lens component that has a negative refractive power" means that the lens component as a whole has a negative refractive power.

The terms "first lens group", "second lens group", "third lens group", "vibration-proof group", and "rear group" are not limited to a configuration consisting of a plurality of lenses, but may be a configuration consisting of only one lens. The "first lens group", "second lens group", and "third lens group" in the present specification refer to parts each including at least one lens. The parts are constituents part of the imaging lens and are divided by air spacings that change during focusing. During focusing, each lens group moves or remains stationary, and the mutual spacing between the lenses in each lens group does not change.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power, and the surface shape of the lens including the aspherical surface will be used in terms of the paraxial region unless otherwise specified.

In the present specification, the term "whole system" means an imaging lens. The "back focal length in terms of the air conversion distance" is the air conversion distance on the optical axis from the lens surface closest to the image side in the whole system to the image plane. The "focal length" used in a conditional expression is a paraxial focal length. The values used in Conditional Expressions are values in a case where the d line is used as a reference in a state where the infinite distance object is in focus unless otherwise specified.

The "d line", "C line", "F line", and "g line" described in the present specification are emission lines. In the present specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers). The partial dispersion ratio θgF between the g line and the F line of a certain lens is defined by θgF=(Ng−NF)/(NF−NC), where Ng, NF, and NC are the refractive indexes of the lens at the g line, the F line, and the C line.

According to the present disclosure, it is possible to provide a telephoto type imaging lens which has a small size, a light weight, and favorable optical performance, and an imaging apparatus provided with the imaging lens.

BRIEF DESCRIPTION OF THE DRAWINGS

FIG. 2 is a cross-sectional view showing a configuration and luminous flux in each in-focus state of the imaging lens of FIG. 1.

DESCRIPTION OF EMBODIMENTS

Hereinafter, embodiments of the present disclosure will be described with reference to the accompanying drawings.

Figure 1:
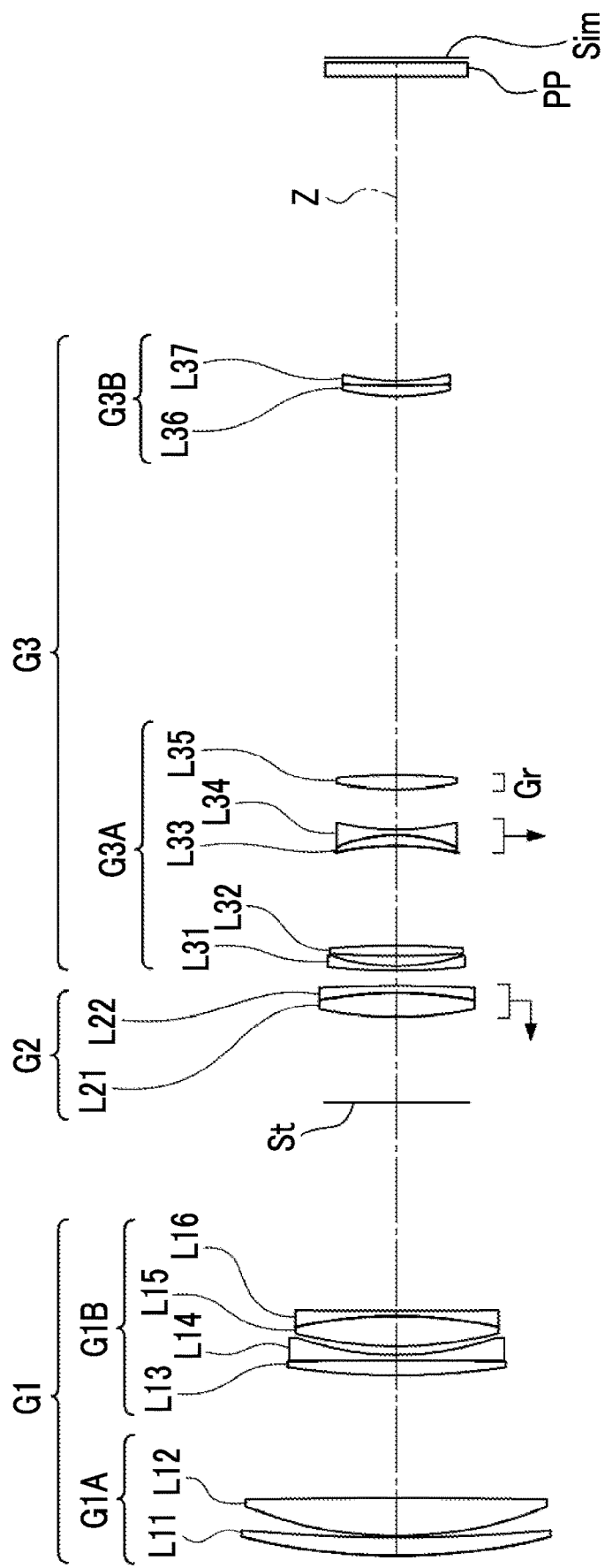
FIG. 1 is a cross-sectional view showing a configuration of an imaging lens according to an embodiment, which corresponds to the imaging lens of Example 1.

FIG. 1 shows a cross-sectional view of the configuration of the imaging lens according to the embodiment of the present disclosure in a state in which the infinite distance object is in focus. FIG. 2 shows a cross-sectional view showing a configuration and luminous flux in each in-focus state of the imaging lens of FIG. 1. FIG. 2 shows a state in which the infinite distance object is in focus in the upper part labeled "infinity", and shows a state in which the closest range object at a distance of 2.2 m (meters) from the image plane Sim is in focus in the lower part labeled "closest". In the present specification, an object at an infinite distance is referred to as the infinite distance object, and an object at the closest distance is referred to as the closest range object. FIG. 2 shows, as the luminous flux, the on-axis luminous flux 2 and the luminous flux 3 with the maximum angle of view in the upper part, and shows the on-axis luminous flux 4 and the luminous flux 5 with the maximum angle of view in the lower part. The examples shown in FIGS. 1 and 2 correspond to the imaging lens of Example 1 to be described later. In FIGS. 1 and 2, the left side is the object side and the right side is the image side. Hereinafter, the description will be made mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens of the present disclosure consists of, in order from the object side to the image side along the optical axis Z, a first lens group G1 that has a positive refractive power, an aperture stop St, a second lens group G2 that has a positive refractive power, and a third lens group G3 that has a negative refractive power. By forming the lens group closest to the object side as a lens group that has a positive refractive power, it is easier to achieve reduction in diameter of the lens group closer to the image side than the lens group. As a result, there is an advantage in achieving reduction in weight of the whole lens system.

Further, the imaging lens of the present disclosure is configured such that the first lens group G1 and the third lens group G3 remain stationary with respect to the image plane Sim, and the second lens group G2 moves along the optical axis Z during focusing from the infinite distance object to the closest range object. In the present specification, the group that moves during focusing is referred to as a "focus group". Focusing is performed by moving the focus group. In the imaging lens of the present disclosure, the focus group consists of the second lens group G2.

In the imaging lens of the present disclosure, it is easy to achieve reduction in diameter of the focus group by adopting a lens group configuration, in which positive, aperture stop St, positive, and negative are arranged in order from the object side to the image side, and setting the behavior of each lens group during focusing as described above. Further, since it is easy to increase the backlash magnification of the focus group, there is an advantage in achieving reduction in amount of movement of the focus group during focusing. As a result, there is an advantage in shortening the total length of the lens system. The backlash magnification described herein refers to a ratio of the amount of movement of the image plane position to the amount of unit movement of the focus group.

For example, the imaging lens of FIG. 1 is configured as follows. The first lens group G1 consists of six lenses L11 to L16 in order from the object side to the image side. The second lens group G2 consists of two lenses, lenses L21 to L22. The third lens group G3 consists of seven lenses L31 to L37 in order from the object side to the image side. The aperture stop St of FIG. 1 does not indicate a size and a shape, but indicates a position in the optical axis direction.

In the example of FIG. 1, the entire second lens group moves integrally during focusing, and the other lens groups remain stationary with respect to the image plane Sim. The term "integral movement" described herein means that the same amount of movement is performed in the same direction at the same time. The arrow pointing to the left below the second lens group G2 in FIG. 1 indicates that the second lens group G2 is a focus group moving toward the object side during focusing from the infinite distance object to the closest range object.

Next, a preferred configuration and a possible configuration of the imaging lens of the present disclosure will be described. In the following description of preferred and possible configurations, the term "imaging lens of the present disclosure" is also simply referred to as an "imaging lens" to avoid redundancy.

Regarding the total length of the lens system, it is preferable that the imaging lens satisfies Conditional Expression (1). Here, it assumed that a sum of a distance on the optical axis from a lens surface closest to the object side in the first lens group G1 to a lens surface closest to the image side in the third lens group G3 and a back focal length of a whole system at an air conversion distance is TL. Further, it assumed that a focal length of the whole system in a state in which an infinite distance object is in focus is f. By satisfying Conditional Expression (1), there is an advantage in achieving reduction in size. In order to obtain more favorable characteristics, it is more preferable that the imaging lens satisfies Conditional Expression (1-1), and it is yet more preferable that the imaging lens satisfies Conditional Expression (1-2).

$$0 < TL/f < 0.64 \quad (1)$$

$$0 < TL/f < 0.63 \quad (1\text{-}1)$$

$$0 < TL/f < 0.62 \quad (1\text{-}2)$$

Assuming that a focal length of the whole system in a state in which the infinite distance object is in focus is f and a focal length of the first lens group G1 is f1, it is preferable that the imaging lens satisfies Conditional Expression (2). By not allowing the corresponding value of Conditional Expression (2) to be equal to or less than the lower limit, there is an advantage in achieving reduction in diameters of the aperture stop St and the lens closer to the image side than the aperture stop St. By not allowing the corresponding value of Conditional Expression (2) to be equal to or greater than the upper limit, there is an advantage in suppressing spherical aberration. In order to obtain more favorable characteristics, it is more preferable that the imaging lens satisfies Conditional Expression (2-1), and it is yet more preferable that the imaging lens satisfies Conditional Expression (2-2).

$$1.5 < f/f1 < 5 \quad (2)$$

$$1.6 < f/f1 < 4.5 \quad (2\text{-}1)$$

$$1.7 < f/f1 < 3.5 \quad (2\text{-}2)$$

Assuming that a maximum half angle of view in a state in which the infinite distance object is in focus is ω and the unit of ω is degrees, it is preferable that the imaging lens satisfies Conditional Expression (3). FIG. 2 shows ω as an example thereof. By satisfying Conditional Expression (3), the lens system is suitable for the telephoto type. Therefore, the effect of reduction in size and reduction in weight of the imaging lens of the present disclosure can be set to be remarkable. In order to obtain more favorable characteristics, it is more preferable that the imaging lens satisfies Conditional Expression (3-1), and it is yet more preferable that the imaging lens satisfies Conditional Expression (3-2).

$$0 < \omega < 4 \quad (3)$$

$$0 < \omega < 3 \quad (3\text{-}1)$$

$$0 < \omega < 2 \quad (3\text{-}2)$$

The first lens group G1 may be configured to include a diffractive optical surface. Since the diffractive optical surface is included therein, there is an advantage in correcting longitudinal chromatic aberration. In a case where the first lens group G1 includes a diffractive optical surface, it is preferable that the imaging lens satisfies Conditional Expression (4). Here, it is assumed that the distance on the optical axis from the diffractive optical surface to the aperture stop St is dDOE. Further, TL used herein is the same as TL of Conditional Expression (1). By not allowing the corresponding value of Conditional Expression (4) to be equal to or less than the lower limit, it is easy to correct longitudinal chromatic aberration. By not allowing the corresponding value of Conditional Expression (4) to be equal to or greater than the upper limit, there is an advantage in shortening the total length of the lens system. In order to obtain more favorable characteristics, it is more preferable that the imaging lens satisfies Conditional Expression (4-1), and it is yet more preferable that the imaging lens satisfies Conditional Expression (4-2).

$$0.1 < dDOE/TL < 0.5 \quad (4)$$

$$0.15 < dDOE/TL < 0.4 \quad (4\text{-}1)$$

$$0.2 < dDOE/TL < 0.35 \quad (4\text{-}2)$$

Assuming that a focal length of the second lens group G2 is f2, it is preferable that the imaging lens satisfies Conditional Expression (5). f used herein is the same as f in Conditional Expression (1). By not allowing the corresponding value of Conditional Expression (5) to be equal to or less than the lower limit, there is an advantage in achieving reduction in amount of movement of the focus group during focusing. By not allowing the corresponding value of Conditional Expression (5) to be equal to or greater than the upper limit, it is possible to suppress the strictness of the stopping accuracy during focusing. In order to obtain more favorable characteristics, it is more preferable that the imaging lens satisfies Conditional Expression (5-1), and it is yet more preferable that the imaging lens satisfies Conditional Expression (5-2).

$$0<f/f2<6 \tag{5}$$

$$2\leq f/f2<5 \tag{5-1}$$

$$2.5<f/f2<4 \tag{5-2}$$

Assuming that a focal length of the third lens group G3 is f3, it is preferable that the imaging lens satisfies Conditional Expression (6). f used herein is the same as f in Conditional Expression (1). By not allowing the corresponding value of Conditional Expression (6) to be equal to or less than the lower limit, there is an advantage in shortening the total length of the lens system. By not allowing the corresponding value of Conditional Expression (6) to be equal to or greater than the upper limit, there is an advantage in suppressing field curvature. In order to obtain more favorable characteristics, it is more preferable that the imaging lens satisfies Conditional Expression (6-1), and it is yet more preferable that the imaging lens satisfies Conditional Expression (6-2).

$$-30<f/f3<0 \tag{6}$$

$$-25<f/f3<-2.5 \tag{6-1}$$

$$-20<f/f3<-5 \tag{6-2}$$

It is preferable that the imaging lens satisfies Conditional Expression (7). TL used herein is the same as TL of Conditional Expression (1). Further, here, it is assumed that a distance on the optical axis between an object side surface of a positive lens having a strongest refractive power among positive lenses disposed closer to the image side than the aperture stop St and an object side surface of a negative lens having a strongest refractive power among negative lenses disposed closer to the image side than the aperture stop St is Δd. For example, FIG. 2 shows Δd. In the example of FIG. 1, the positive lens having the strongest refractive power among the positive lenses disposed closer to the image side than the aperture stop St is the lens L33, and the negative lens having the strongest negative refractive power among the negative lenses disposed closer to the image side than the aperture stop St is the lens L34. Regarding the lower limit of Conditional Expression (7), Δd>0 and TL>0, and thus 0<Δd/TL. By not allowing the corresponding value of Conditional Expression (7) to be equal to or greater than the upper limit, there is an advantage in correcting aberrations. In order to obtain more favorable characteristics, it is more preferable that the imaging lens satisfies Conditional Expression (7-1), and it is yet more preferable that the imaging lens satisfies Conditional Expression (7-2).

$$0<\Delta d/TL<0.3 \tag{7}$$

$$0<\Delta d/TL<0.25 \tag{7-1}$$

$$0<\Delta d/TL<0.2 \tag{7-2}$$

It is preferable that the imaging lens satisfies Conditional Expression (8). TL used herein is the same as TL of Conditional Expression (1). Further, here, it is assumed that a distance on the optical axis from the aperture stop St to the object side surface of the positive lens having the strongest refractive power among the positive lenses disposed closer to the image side than the aperture stop St is dSpmax. For example, FIG. 2 shows dSpmax. By not allowing the corresponding value of Conditional Expression (8) to be equal to or less than the lower limit, there is an advantage in correcting spherical aberration. By not allowing the corresponding value of Conditional Expression (8) to be equal to or greater than the upper limit, there is an advantage in correcting field curvature. In order to obtain more favorable characteristics, it is more preferable that the imaging lens satisfies Conditional Expression (8-1), and it is yet more preferable that the imaging lens satisfies Conditional Expression (8-2).

$$0.05<dSp\,\mathrm{max}/TL<0.6 \tag{8}$$

$$0.1<dSp\,\mathrm{max}/TL<0.5 \tag{8-1}$$

$$0.13<dSp\,\mathrm{max}/TL<0.4 \tag{8-2}$$

It is preferable that the imaging lens satisfies Conditional Expression (9). TL used herein is the same as TL of Conditional Expression (1). Further, here, it is assumed that the longest air spacing on the optical axis in the first lens group is dair. For example, FIG. 2 shows a dair. By not allowing the corresponding value of Conditional Expression (9) to be equal to or less than the lower limit, there is an advantage in achieving reduction in weight. By not allowing the corresponding value of Conditional Expression (9) to be equal to or greater than the upper limit, there is an advantage in correcting spherical aberration. In order to obtain more favorable characteristics, it is more preferable that the imaging lens satisfies Conditional Expression (9-1), and it is yet more preferable that the imaging lens satisfies Conditional Expression (9-2).

$$0.01<\mathrm{dair}/TL<0.25 \tag{9}$$

$$0.015<\mathrm{dair}/TL<0.2 \tag{9-1}$$

$$0.02<\mathrm{dair}/TL<0.15 \tag{9-2}$$

The first lens group G1 may be configured to consist of, in order from the object side to the image side, a first A lens group G1A that has a positive refractive power and a first B lens group G1B that has a negative refractive power and is separated from the first A lens group G1A through the longest air spacing on the optical axis in the first lens group G1. For example, in the example of FIG. 1, the first A lens group G1A consists of lenses L11 and L12, and the first B lens group G1B consists of lenses L13 to L16.

In the configuration in which the first lens group G1 consists of the first A lens group G1A and the first B lens group G1B, assuming that a focal length of the first A lens group G1A is f1A and a focal length of the first B lens group G1B is f1B, it is preferable that the imaging lens satisfies Conditional Expression (10). By not allowing the corresponding value of Conditional Expression (10) to be equal to or less than the lower limit, the spread of the luminous flux can be suppressed. As a result, there is an advantage in achieving reduction in diameter of the opening portion of the aperture stop St. Regarding the upper limit of Conditional Expression (10), f1A>0 and f1B<0, and thus f1A/f1B<0. In order to obtain more favorable characteristics, it is more preferable that the imaging lens satisfies Conditional Expression (10-1), and it is yet more preferable that the imaging lens satisfies Conditional Expression (10-2).

$$-2.5<f1A/f1B<0 \tag{10}$$

$$-2<f1A/f1B<0 \tag{10-1}$$

$$-1.5<f1A/f1B<0 \tag{10-2}$$

In the configuration in which the first lens group G1 consists of the first A lens group G1A and the first B lens group G1B, it is preferable that the first B lens group G1B includes a lens pair consisting of a positive lens and a negative lens adjacent to each other. In such a case, there is an advantage in correcting longitudinal chromatic aberration.

Regarding the phrase "lens pair consisting of a positive lens and a negative lens adjacent to each other" in the present specification, the positive lens and the negative lens may be disposed adjacent to each other with an air spacing interposed therebetween, and the positive lens and the negative lens may be cemented. Further, the positive lens and the negative lens may be disposed in order from the object side to the image side, or the negative lens and the positive lens may be disposed in order from the object side to the image side.

For convenience of description, the "lens pair consisting of a positive lens and a negative lens adjacent to each other" included in the first B lens group G1B will be referred to as a "first lens pair" below. In the configuration in which the first B lens group G1B includes the first lens pair, assuming that an Abbe number of the positive lens of the first lens pair based on the d line is ν1Bp, it is preferable that the imaging lens satisfies Conditional Expression (11). By satisfying Conditional Expression (11), there is another advantage in correcting longitudinal chromatic aberration. In order to obtain more favorable characteristics, it is more preferable that the imaging lens satisfies Conditional Expression (11-1), and it is yet more preferable that the imaging lens satisfies Conditional Expression (11-2).

$$40 < \nu1Bp < 100 \tag{11}$$

$$50 < \nu1Bp < 100 \tag{11-1}$$

$$60 < \nu1Bp < 100 \tag{11-2}$$

The third lens group G3 consists of, in order from the object side to the image side, a third A lens group G3A and a third B lens group G3B that is separated from the third A lens group G3A through the longest air spacing on the optical axis in the third lens group G3. In such a configuration, it is preferable that the third A lens group G3A includes two or more negative lenses and two or more positive lenses. In such a case, there is an advantage in correcting spherical aberration.

In the above-mentioned configuration in which the third lens group G3 consists of the third A lens group G3A and the third B lens group G3B, assuming that a focal length of the third A lens group G3A is f3A and a focal length of the third B lens group G3B is f3B, it is preferable that the imaging lens satisfies Conditional Expression (12). By satisfying Conditional Expression (12), there is an advantage in maintaining a favorable balance between the correction of field curvature and the correction of spherical aberration. For example, in the example of FIG. 1, the third A lens group G3A consists of lenses L31 to L35, and the third B lens group G3B consists of lenses L36 and L37. In order to obtain more favorable characteristics, it is more preferable that the imaging lens satisfies Conditional Expression (12-1), and it is yet more preferable that the imaging lens satisfies Conditional Expression (12-2).

$$-0.3 < f3A/f3B < 4 \tag{12}$$

$$-0.2 < f3A/f3B < 3.5 \tag{12-1}$$

$$-0.1 < f3A/f3B < 2.5 \tag{12-2}$$

It is preferable that the third lens group G3 includes a vibration-proof group that moves in a direction intersecting with the optical axis Z during image blur correction. In such a case, it is possible to provide vibration-proof performance. In the example of FIG. 1, the vibration-proof group consists of lenses L33 and L34. The downward arrow of the lenses L33 and L34 in FIG. 1 indicates that the lenses L33 and L34 are in the vibration-proof group.

In a configuration in which the third lens group G3 includes a vibration-proof group, it is preferable that the imaging lens satisfies Conditional Expression (13). f used herein is the same as f in Conditional Expression (1). Further, here, it is assumed that a focal length of the vibration-proof group is fis. By not allowing the corresponding value of Conditional Expression (13) to be equal to or less than the lower limit, there is an advantage in achieving reduction in amount of movement of the vibration-proof group during image blur correction. By not allowing the corresponding value of Conditional Expression (13) to be equal to or greater than the upper limit, there is an advantage in suppressing fluctuation in various aberrations during image blur correction. In order to obtain more favorable characteristics, it is more preferable that the imaging lens satisfies Conditional Expression (13-1), and it is yet more preferable that the imaging lens satisfies Conditional Expression (13-2).

$$2.5 < f/|fis| < 30 \tag{13}$$

$$5 < f/|fis| < 20 \tag{13-1}$$

$$9 < f/|fis| < 18 \tag{13-2}$$

It is preferable that the third lens group G3 includes a rear group Gr that has a positive refractive power closer to the image side than the vibration-proof group. In such a case, there is an advantage in achieving reduction in amount of movement of the vibration-proof group during image blur correction. In a configuration in which the third lens group G3 includes the rear group Gr, it is preferable that the imaging lens satisfies Conditional Expression (14). f used herein is the same as f in Conditional Expression (1). Further, here, it is assumed that the focal length of the rear group Gr is fr. By not allowing the corresponding value of Conditional Expression (14) to be equal to or less than the lower limit, there is an advantage in achieving reduction in amount of movement of the vibration-proof group during image blur correction. By not allowing the corresponding value of Conditional Expression (14) to be equal to or greater than the upper limit, there is an advantage in ensuring favorable vibration-proof performance. In order to obtain more favorable characteristics, it is more preferable that the imaging lens satisfies Conditional Expression (14-1), and it is yet more preferable that the imaging lens satisfies Conditional Expression (14-2).

$$2.5 < f/fr < 25 \tag{14}$$

$$3 < f/fr < 20 \tag{14-1}$$

$$5 < f/fr < 15 \tag{14-2}$$

The rear group Gr may be a group consisting of one lens or a group consisting of a plurality of lenses. The vibration-proof group and the rear group Gr may be disposed continuously or discontinuously. For example, in the example of FIG. 1, the rear group Gr consists only of the lens L35.

It is preferable that the lens surface closest to the image side in the third lens group G3 is a concave surface. In such a case, there is an advantage in correcting field curvature.

It is preferable that a lens component that has a negative refractive power is disposed between the second lens group G2 and the vibration-proof group. In such a case, there is an advantage in suppressing fluctuations in vibration-proof performance during focusing. In the present specification, one lens component is one single lens or one cemented lens. In the configuration in which the lens component that has a negative refractive power is disposed between the second lens group G2 and the vibration-proof group, assuming that a refractive index of a negative lens included in the lens component having a negative refractive power at the d line is N3Cn, it is preferable that the imaging lens satisfies Conditional Expression (15). By satisfying Conditional Expression (15), there is an advantage in correcting field curvature. In order to obtain more favorable characteristics, it is more preferable that the imaging lens satisfies Conditional Expression (15-1), and it is yet more preferable that the imaging lens satisfies Conditional Expression (15-2).

$$1.75 < N3Cn < 2.2 \tag{15}$$

$$1.8 < N3Cn < 2.2 \tag{15-1}$$

$$1.85 < N3Cn < 2.1 \tag{15-2}$$

In the configuration in which the lens component that has a negative refractive power is disposed between the second lens group G2 and the vibration-proof group, it is preferable that a positive lens is disposed closer to the image side than the negative lens included in the lens component that has a negative refractive power. In such a case, there is an advantage in suppressing fluctuations in vibration-proof performance during focusing.

It is preferable that the vibration-proof group consists of a lens pair consisting of a positive lens and a negative lens adjacent to each other. In such a case, there is an advantage in correcting eccentric chromatic aberration. For convenience of description, the "lens pair consisting of a positive lens and a negative lens adjacent to each other" included in the vibration-proof group will be referred to as a "second lens pair" below.

In the configuration in which the vibration-proof group includes the second lens pair, assuming that a refractive index of the positive lens of the second lens pair at the d line is N3p and a refractive index of the negative lens of the second lens pair at the d line is N3n, it is preferable that the imaging lens satisfies Conditional Expression (16). By satisfying Conditional Expression (16), there is another advantage in correcting eccentric chromatic aberration. In order to obtain more favorable characteristics, it is more preferable that the imaging lens satisfies Conditional Expression (16-1), and it is yet more preferable that the imaging lens satisfies Conditional Expression (16-2).

$$-0.15 < N3p - N3n < 0.5 \tag{16}$$

$$-0.1 < N3p - N3n < 0.4 \tag{16-1}$$

$$-0.05 < N3p - N3n < 0.3 \tag{16-2}$$

In the configuration in which the vibration-proof group includes the second lens pair, assuming that an Abbe number of the positive lens of the second lens pair based on the d line is ν3p and an Abbe number of the negative lens of the second lens pair based on the d line is ν3n, it is preferable that the imaging lens satisfies Conditional Expression (17). By satisfying Conditional Expression (17), there is another advantage in correcting eccentric chromatic aberration. In order to obtain more favorable characteristics, it is more preferable that the imaging lens satisfies Conditional Expression (17-1), and it is yet more preferable that the imaging lens satisfies Conditional Expression (17-2).

$$-40 < \nu3p - \nu3n < -5 \tag{17}$$

$$-35 < \nu3p - \nu3n < -10 \tag{17-1}$$

$$-30 < \nu3p - \nu3n < -15 \tag{17-2}$$

In the configuration in which the vibration-proof group includes the second lens pair, assuming that a partial dispersion ratio of the positive lens of the second lens pair between the g line and the F line is θ3p and a partial dispersion ratio of the negative lens of the second lens pair between the g line and the F line is θ3n, it is preferable that the imaging lens satisfies Conditional Expression (18). By satisfying Conditional Expression (18), there is another advantage in correcting eccentric chromatic aberration. In order to obtain more favorable characteristics, it is more preferable that the imaging lens satisfies Conditional Expression (18-1), and it is yet more preferable that the imaging lens satisfies Conditional Expression (18-2).

$$0 < \theta3p - \theta3n < 0.1 \tag{18}$$

$$0.01 < \theta3p - \theta3n < 0.08 \tag{18-1}$$

$$0.02 < \theta3p - \theta3n < 0.07 \tag{18-2}$$

It is more preferable that the imaging lens satisfies Conditional Expressions (16), (17), and (18) at the same time in the configuration in which the vibration-proof group includes the second lens pair. In order to obtain more favorable characteristics, it is yet more preferable that the imaging lens satisfies Conditional Expressions (16), (17), and (18) at the same time, and then satisfies at least one of Conditional Expressions (16-1), (16-2), (17-1), (17-2), (18-1), and (18-2).

It is preferable that the second lens group G2 consists of a lens pair consisting of a positive lens and a negative lens adjacent to each other. In such a case, there is an advantage in suppressing fluctuation in longitudinal chromatic aberration in a case where the distance between the object and the imaging lens fluctuates. For convenience of description, the "lens pair consisting of a positive lens and a negative lens adjacent to each other" included in the second lens group G2 will be referred to as a "third lens pair" below.

In a configuration in which the second lens group G2 includes a third lens pair, assuming that a refractive index of the positive lens of the third lens pair at the d line is N2p and a refractive index of the negative lens of the third lens pair at the d line is N2n, it is preferable that the imaging lens satisfies Conditional Expression (19). By satisfying Conditional Expression (19), there is an advantage in correcting longitudinal chromatic aberration. In order to obtain more favorable characteristics, it is more preferable that the imaging lens satisfies Conditional Expression (19-1), and it is yet more preferable that the imaging lens satisfies Conditional Expression (19-2).

$$-0.6 < N2p - N2n < 0 \tag{19}$$

$$-0.5 < N2p - N2n < -0.05 \tag{19-1}$$

$$-0.4 < N2p - N2n < -0.1 \tag{19-2}$$

In the configuration in which the second lens group G2 includes the third lens pair, an Abbe number of the positive lens of the third lens pair based on the d line is ν2p and an Abbe number of the negative lens of the third lens pair based on the d line is ν2n, it is preferable that the imaging lens satisfies Conditional Expression (20). By satisfying Conditional Expression (20), there is an advantage in correcting longitudinal chromatic aberration. In order to obtain more favorable characteristics, it is more preferable that the imaging lens satisfies Conditional Expression (20-1), and it is yet more preferable that the imaging lens satisfies Conditional Expression (20-2).

$$-10 < v2p - v2n < 30 \quad (20)$$

$$-5 < v2p - v2n < 25 \quad (20\text{-}1)$$

$$-0.5 < v2p - v2n < 20 \quad (20\text{-}2)$$

In the configuration in which the second lens group G2 includes the third lens pair, assuming that a partial dispersion ratio of the positive lens of the third lens pair between a g line and an F line is θ2p and a partial dispersion ratio of the negative lens of the third lens pair between the g line and the F line is θ2n, it is preferable that the imaging lens satisfies Conditional Expression (21). By satisfying Conditional Expression (21), there is an advantage in correcting longitudinal chromatic aberration. In order to obtain more favorable characteristics, it is more preferable that the imaging lens satisfies Conditional Expression (21-1), and it is yet more preferable that the imaging lens satisfies Conditional Expression (21-2).

$$-0.15 < \theta 2p - \theta 2n < 0.1 \quad (21)$$

$$-0.1 < \theta 2p - \theta 2n < 0.05 \quad (21\text{-}1)$$

$$-0.03 < \theta 2p - \theta 2n < 0.01 \quad (21\text{-}2)$$

In the configuration in which the second lens group G2 includes the third lens pair, it is more preferable that the imaging lens satisfies Conditional Expressions (19), (20), and (21) at the same time. In order to obtain more favorable characteristics, it is yet more preferable that the imaging lens satisfies Conditional Expressions (19), (20), and (21) at the same time, and then satisfies at least one of Conditional Expressions (19-1), (19-2), (20-1), (20-2), (21-1), and (21-2).

It is preferable that the number of lenses included in the second lens group G2 is 2 or less. In such a case, there is an advantage in achieving reduction in weight of the focus unit.

Assuming that a back focal length of the whole system in terms of the air conversion distance is Bf, it is preferable that the imaging lens satisfies Conditional Expression (22). f and ω used herein are the same as f in Conditional Expression (1) and ω in Conditional Expression (3), respectively. Further, tan is tangent. By not allowing the corresponding value of Conditional Expression (22) to be equal to or less than the lower limit, it is possible to prevent the back focal length from becoming excessively short with respect to the size of the image circle. As a result, there is an advantage in achieving reduction in diameter of the third lens group G3. By not allowing the corresponding value of Conditional Expression (22) to be equal to or greater than the upper limit, it is possible to prevent the back focal length from becoming excessively long with respect to the size of the image circle. As a result, there is an advantage in shortening the total length of the lens system. In order to obtain more favorable characteristics, it is more preferable that the imaging lens satisfies Conditional Expression (22-1), and it is yet more preferable that the imaging lens satisfies Conditional Expression (22-2).

$$1.5 < Bf/(f \times \tan \omega) < 10 \quad (22)$$

$$2 < Bf/(f \times \tan \omega) < 7.5 \quad (22\text{-}1)$$

$$2.5 < Bf/(f \times \tan \omega) < 6 \quad (22\text{-}2)$$

Assuming that an F number of the whole system in a state in which the infinite distance object is in focus is FNo, it is preferable that the imaging lens satisfies Conditional Expression (23). Assuming that an opening diameter of the aperture stop St is variable, FNo is an open F number. Further, f used herein is the same as f in Conditional Expression (1). By not allowing the corresponding value of Conditional Expression (23) to be equal to or less than the lower limit, the technique of the present disclosure can be applied to a lens system having an appropriate size. Therefore, the effect of reduction in weight can be obtained. By not allowing the corresponding value of Conditional Expression (23) to be equal to or greater than the upper limit, it is possible to suppress an excessive increase in size of the lens system. Therefore, effective reduction in weight is possible. In order to obtain more favorable characteristics, it is more preferable to satisfy Conditional Expression (23-1), and it is yet more preferable to satisfy Conditional Expression (23-2).

$$45 < f/FNo < 80 \quad (23)$$

$$50 < f/FNo < 75 \quad (23\text{-}1)$$

$$55 < f/FNo < 60 \quad (23\text{-}2)$$

It is preferable that the lens component that has a positive refractive power and the positive lens are disposed in order from the position closest to the object side to the image side in the first lens group G1. In such a case, there is an advantage in correcting spherical aberration.

In a case where a lens component that has a positive refractive power is disposed closest to the object side in the first lens group G1, the lens component that has a positive refractive power may be a cemented lens. In such a case, there is an advantage in correcting longitudinal chromatic aberration.

A cemented lens that consists of a negative lens and a positive lens and that has a positive refractive power as a whole may be disposed closest to the object side in the first lens group G1. In such a manner, in the configuration in which the cemented lens consisting of the negative lens and the positive lens is disposed closest to the object side in the first lens group G1, assuming that a refractive index of the positive lens of the cemented lens at the d line is N1p and a refractive index of the negative lens of the cemented lens at the d line is N1n, it is preferable that the imaging lens satisfies Conditional Expression (24). By satisfying Conditional Expression (24), there is an advantage in correcting longitudinal chromatic aberration. In order to obtain more favorable characteristics, it is more preferable that the imaging lens satisfies Conditional Expression (24-1), and it is yet more preferable that the imaging lens satisfies Conditional Expression (24-2).

$$-0.5 < N1p - N1n < 0.35 \quad (24)$$

$$-0.35 < N1p - N1n < 0.25 \quad (24\text{-}1)$$

$$-0.28 < N1p - N1n < 0.18 \quad (24\text{-}2)$$

In a configuration in which a cemented lens consisting of a negative lens and a positive lens is disposed closest to the object side in the first lens group G1, assuming that an Abbe number of the positive lens of the cemented lens based on the d line is set to v1p and the Abbe number of the negative lens of the cemented lens based on the d line is v1n, it is preferable that the imaging lens satisfies Conditional Expression (25). By satisfying Conditional Expression (25), there is an advantage in correcting longitudinal chromatic aberration. In order to obtain more favorable characteristics, it is more preferable that the imaging lens satisfies Conditional Expression (25-1), and it is yet more preferable that the imaging lens satisfies Conditional Expression (25-2).

$$-45<v1p-v1n<0 \tag{25}$$

$$-35<v1p-v1n<0 \tag{25-1}$$

$$-25<v1p-v1n<0 \tag{25-2}$$

In the configuration in which the cemented lens consisting of the negative lens and the positive lens is disposed closest to the object side in the first lens group G1, assuming that a partial dispersion ratio of the positive lens of the cemented lens between the g line and the F line is θ1p and a partial dispersion ratio of the negative lens of the cemented lens between the g line and the F line is θ1n, it is preferable that the imaging lens satisfies Conditional Expression (26). By satisfying Conditional Expression (26), there is an advantage in correcting longitudinal chromatic aberration. In order to obtain more favorable characteristics, it is more preferable that the imaging lens satisfies Conditional Expression (26-1), and it is yet more preferable that the imaging lens satisfies Conditional Expression (26-2).

$$0<\theta1p-\theta1n<0.15 \tag{26}$$

$$0<\theta1p-\theta1n<0.1 \tag{26-1}$$

$$0<\theta1p-\theta1n<0.05 \tag{26-2}$$

In the configuration in which the cemented lens consisting of the negative lens and the positive lens is disposed closest to the object side in the first lens group G1, it is yet more preferable that the imaging lens satisfies Conditional Expressions (24), (25), and (26) at the same time. In order to obtain more favorable characteristics, it is yet more preferable that the imaging lens satisfies Conditional Expressions (24), (25), and (26) at the same time, and then satisfies at least one of Conditional Expressions (24-1), (24-2), (25-1), (25-2), (26-1), and (26-2).

In a configuration in which a lens component that has a positive refractive power and a positive lens are disposed in order from the position closest to the object side to the image side in the first lens group G1, it is preferable that the imaging lens satisfies Conditional Expression (27). Here, it is assumed that an Abbe number of the positive lens continuously disposed on the image side of the lens component that has a positive refractive power based on the d line is v1Sp. By satisfying Conditional Expression (27), there is an advantage in correcting lateral chromatic aberration. In order to obtain more favorable characteristics, it is more preferable that the imaging lens satisfies Conditional Expression (27-1), and it is yet more preferable that the imaging lens satisfies Conditional Expression (27-2).

$$70<v1Sp<100 \tag{27}$$

$$80<v1Sp<100 \tag{27-1}$$

$$90<v1Sp<100 \tag{27-2}$$

Two or more positive lenses may be disposed in order from the position closest to the object side to the image side in the first lens group G1. In such a case, there is an advantage in achieving reduction in weight of the optical system.

In a configuration in which two or more positive lenses are disposed continuously in order from the position closest to the object side to the image side in the first lens group G1, it is preferable that the imaging lens satisfies Conditional Expression (28). Here, it is assumed that an Abbe number of at least one of the two or more positive lenses disposed continuously based on the d line v1pp. By satisfying Conditional Expression (28), there is an advantage in correcting longitudinal chromatic aberration. In order to obtain more favorable characteristics, it is more preferable that the imaging lens satisfies Conditional Expression (28-1), and it is yet more preferable that the imaging lens satisfies Conditional Expression (28-2).

$$70<v1pp<100 \tag{28}$$

$$80<v1pp<100 \tag{28-1}$$

$$90<v1pp<100 \tag{28-2}$$

In the configuration in which the two or more positive lenses are disposed continuously in order from the position closest to the object side to the image side in the first lens group G1, it is preferable that the imaging lens satisfies Conditional Expression (29). Here, it is assumed that a specific gravity of the positive lens satisfying Conditional Expression (28) among the two or more positive lenses of the first lens group G1 continuously disposed is Sg. By satisfying Conditional Expression (29), there is an advantage in achieving reduction in weight of the optical system. In order to obtain more favorable characteristics, it is more preferable that the imaging lens satisfies Conditional Expression (29-1), and it is yet more preferable that the imaging lens satisfies Conditional Expression (29-2).

$$0<Sg<5 \tag{29}$$

$$0<Sg<4.5 \tag{29-1}$$

$$0<Sg<4 \tag{29-2}$$

For favorable correction of longitudinal chromatic aberration, the first lens group G1 includes preferably one or more cemented lenses, and more preferably two or more cemented lenses. However, in order to improve productivity and a degree of freedom in design, the number of cemented lenses included in the first lens group G1 is preferably 5 or less, more preferably 4 or less, and yet more preferably 3 or less. As can be seen from the above-mentioned circumstances, the number of cemented lenses included in the first lens group G1 is preferably 1 or more and 5 or less, more preferably 2 or more and 4 or less, and yet more preferably 2 or more and 3 or less.

The first lens group G1 may be configured to include a compound aspherical lens. The inclusion of the compound aspherical lens in the first lens group G1 in which the lens diameter tends to be relatively large is advantageous for achieving reduction in weight.

In the configuration in which the first lens group G1 includes the compound aspherical lens, assuming that a distance on the optical axis from the surface, on which the aspherical surface of the compound aspherical lens is formed, to the aperture stop St is dHAS, it is preferable that the imaging lens satisfies Conditional Expression (30). TL used herein is the same as TL of Conditional Expression (1). By not allowing the corresponding value of Conditional Expression (30) to be equal to or less than the lower limit, there is an advantage in correcting spherical aberration. By not allowing the corresponding value of Conditional Expression (30) to be equal to or greater than the upper limit, there is an advantage in achieving reduction in weight. In order to obtain more favorable characteristics, it is more preferable that the imaging lens satisfies Conditional Expression (30-1), and it is yet more preferable that the imaging lens satisfies Conditional Expression (30-2).

$$0.05 < dHAS/TL < 0.4 \quad (30)$$

$$0.1 < dHAS/TL < 0.3 \quad (30\text{-}1)$$

$$0.15 < dHAS/TL < 0.2 \quad (30\text{-}2)$$

The example shown in FIG. 1 is an example of the imaging lens of the present disclosure. The number of lenses constituting each group of the imaging lenses of the present disclosure can be different from the number shown in the example shown in FIG. 1. Each group of imaging lenses can be configured as follows, for example.

The number of lenses included in the first lens group G1 may be 6, may be 7, or may be 4.

The number of lenses included in the second lens group G2 may be 2. The second lens group G2 may be configured to consist of one cemented lens. In such a case, the second lens group G2 may be configured to consist of a cemented lens in which a positive lens and a negative lens are cemented. The second lens group G2 may be configured to consist of a positive lens and a negative lens, in order from the object side to the image side.

The number of lenses included in the third lens group G3 may be 7 or 9. In a case where the third lens group G3 consists of the above-mentioned third A lens group G3A and the third B lens group G3B, the third A lens group G3A may be configured to include the vibration-proof group.

The number of lenses included in the vibration-proof group may be 2. The vibration-proof group may be configured to consist of one cemented lens. In such a case, the vibration-proof group may be configured to consist of a cemented lens in which a positive lens and a negative lens are cemented. The vibration-proof group may be configured to consist of a positive lens and a negative lens, in order from the object side to the image side.

the above-mentioned preferable configurations and available configurations including the configurations relating to Conditional Expressions may be any combination, and it is preferable to optionally adopt the configurations in accordance with required specification. It should be noted that Conditional Expressions that the imaging lens of the present disclosure preferably satisfies are not limited to Conditional Expressions described in the form of Expression, and the lower limit and the upper limit are selected from the preferable, more preferable, and yet more preferable conditional expressions. Conditional Expressions may include all conditional expressions obtained through optional combinations.

For example, according to a preferred embodiment of the present disclosure, an imaging lens consists of a first lens group G1 that has a positive refractive power, an aperture stop St, a second lens group G2 that has a positive refractive power, and a third lens group G3 that has a negative refractive power, in order from the object side to the image side. During focusing, the first lens group G1 and the third lens group G3 remain stationary with respect to the image plane Sim, and the second lens group G2 that moves along the optical axis Z, and satisfies Conditional Expressions (1), (2), and (3).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Accordingly, even in a case where common reference numerals are attached in the drawings of different examples, components do not necessarily have a common configuration.

Example 1

FIG. 1 is a cross-sectional view of a configuration of an imaging lens of Example 1, and an illustration method and a configuration thereof are as described above. Therefore, some description is not repeated herein. The imaging lens of Example 1 consists of, in order from the object side to the image side, a first lens group G1 that has a positive refractive power, an aperture stop St, a second lens group G2 that has a positive refractive power, and a third lens group G3 that has a negative refractive power. During focusing from the infinite distance object to the closest range object, the second lens group G2 moves toward the object side, and the first lens group G1 and the third lens group G3 remain stationary with respect to the image plane Sim.

Regarding the imaging lens of Example 1, Table 1 shows basic lens data, Table 2 shows specifications and variable surface spacings. Table 3 shows aspherical coefficients thereof. Table 1 is noted as follows. The column of Sn shows surface numbers in a case where the surface closest to the object side is the first surface and the number is increased one by one toward the image side. The column of R shows a curvature radius of each surface. The sign of the curvature radius of the convex surface facing toward the object side is positive and the sign of the curvature radius of the convex surface facing toward the image side is negative. The column of D shows a surface spacing between each surface and the surface adjacent to the image side on the optical axis. A value at the bottom cell of D indicates a spacing between the image plane Sim and the surface closest to the image side in the table. The column of Nd shows a refractive index of each component at the d line. The column of vd shows an Abbe number of each component based on the d line. The column of θgF shows a partial dispersion ratio of each component between the g line and the F line. Table 1 also shows the aperture stop St and the optical member PP. In a cell of a surface number of a surface corresponding to the aperture stop St, the surface number and a term of (St) are noted.

In the column of material in Table 1, the material names of the components and the names of the manufacturers thereof are shown with periods interposed therebetween. Also in the table of examples to be described later, the column of materials shows the names of manufacturers schematically as described below. "CDGM" refers to Chengdu Gwangmyeong Photoelectric Crotch Co., Ltd. "OHARA" refers to OHARA Corporation. "HOYA" refers to HOYA Corporation. "HIKARI" refers to Hikari Glass Co., Ltd. "NHG" refers to Hubei Xinhua Gwangguk Information Materials Co., Ltd. "SUMITA" refers to Sumita Optical Glass, Inc. "SCHOTT" refers to SCHOTT Corporation.

Table 2 shows a focal length f of the whole system, a back focal length Bf in terms of the air conversion distance of the whole system, and an F number FNo., and a maximum total angle of view of 2ω. The values shown in Table 2 are based on the d line. FNo used in Conditional Expression described above, FNo. in Table 2 and the like, and FNo. in the aberration diagrams to be described later are the same.) (°)

in the cell of 2ω indicates that the unit thereof is a degree. In Table 2, the column of "Infinity" shows values in a state in which the infinite distance object is in focus, and the column of "Closest" shows values in a state in which the closest range object is in focus. In the imaging lens of Example 1, the distance on the optical axis between the object and the image plane Sim in the state in which the closest range object is in focus is 2.2 m (meters), and this point is the same in the aberration diagram data to be described later.

In basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am show numerical values of the aspherical coefficients for each aspherical surface. It should be noted that m of Am is an integer from 3 to 20. The "E±n" (n: an integer) in numerical values of the aspherical coefficients of Table 3 indicates "×10$^{\pm n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that passes through the intersection of the aspherical surface and the optical axis Z and that is perpendicular to the optical axis Z), h is a height (a distance from the optical axis Z to the lens surface), C is an inverse of the paraxial curvature radius, KA and Am are aspherical coefficients, and $\Sigma$ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

| Sn | R | D | Nd | νd | θgF | Material |
|---|---|---|---|---|---|---|
| 1 | 125.85535 | 3.680 | 1.74077 | 27.76 | 0.60791 | H-ZF50.CDGM |
| 2 | 323.00647 | 0.317 | | | | |
| 3 | 79.47663 | 7.500 | 1.43875 | 94.66 | 0.53402 | S-FPL55.OHARA |
| 4 | −1539.06338 | 24.659 | | | | |
| 5 | 148.09529 | 2.983 | 1.49700 | 81.54 | 0.53748 | S-FPL51.OHARA |
| 6 | −2117.90365 | 1.136 | 1.72916 | 54.67 | 0.54503 | H-L.AK52.CDGM |
| 7 | 59.67266 | 1.707 | | | | |
| 8 | 79.78587 | 6.100 | 1.49700 | 81.54 | 0.53748 | S-FPL51.OHARA |
| 9 | −90.87997 | 1.000 | 2.00100 | 29.13 | 0.59952 | TAFD55-W.HOYA |
| 10 | 1941.87793 | 41.675 | | | | |
| 11(St) | ∞ | DD[11] | | | | |
| 12 | 78.80190 | 4.783 | 1.53172 | 48.85 | 0.56700 | H-QF6A.CDGM |
| 13 | −84.13117 | 1.402 | 1.76200 | 40.11 | 0.57415 | H-LAF55.CDGM |
| 14 | −268.61914 | DD[14] | | | | |
| 15 | 123.27018 | 1.000 | 1.90366 | 31.42 | 0.59387 | H-ZLAF75B.CDGM |
| 16 | 42.76343 | 2.000 | | | | |
| 17 | 205.64338 | 2.030 | 1.51742 | 52.15 | 0.55896 | E-CF6.HOYA |
| 18 | −164.70353 | 20.012 | | | | |
| *19 | −53.58806 | 2.285 | 1.88385 | 37.20 | 0.57769 | D-ZLAF67.CDGM |
| 20 | −29.24136 | 1.010 | 1.60300 | 65.46 | 0.54068 | H-ZPK2A.CDGM |
| 21 | 51.25175 | 8.011 | | | | |
| 22 | 66.34214 | 2.766 | 1.59551 | 39.23 | 0.58053 | H-QF14.CDGM |
| 23 | −121.15246 | 75.802 | | | | |
| 24 | 47.49170 | 2j07 | 1.57501 | 41.51 | 0.57711 | H-QF3.CDGM |
| 25 | 240.71221 | 1.000 | 1.65950 | 57.38 | 0.54486 | H-LAK1.CDGM |
| 26 | 43.57809 | 60.993 | | | | |
| 27 | ∞ | 2.850 | 1.51680 | 64.20 | 0.53430 | BSG7.HOYA |
| 28 | ∞ | 0.945 | | | | |

TABLE 2

|  | Infinity | Closest |
|---|---|---|
| f | 484.785 | 311.168 |
| Bf | 63.817 | 63.817 |
| FNo. | 8.2 | 8.9 |
| 2ω(°) | 3.38 | 3.12 |
| DD[11] | 17.137 | 2.997 |
| DD[14] | 3.034 | 17.174 |

TABLE 3

| Sn | 19 |
|---|---|
| KA | 1.0000000E+00 |
| A3 | 0.0000000E+00 |
| A4 | 9.9187964E-07 |
| A5 | -2.9568618E-07 |
| A6 | 5.0888040E-08 |
| A7 | -1.1272658E-09 |
| A8 | 2.4093718E-10 |
| A9 | -7.8059208E-12 |
| A10 | 6.3154959E-13 |
| A11 | 1.0850565E-13 |
| A12 | 8.3225466E-15 |
| A13 | 3.0885025E-16 |
| A14 | -1.4808198E-17 |
| A15 | -2.0819970E-17 |
| A16 | 9.7766264E-19 |
| A17 | -3.5435503E-20 |
| A18 | 4.6975385E-21 |
| A19 | 1.3253297E-22 |
| A20 | -1.5721107E-23 |

Figure 3:
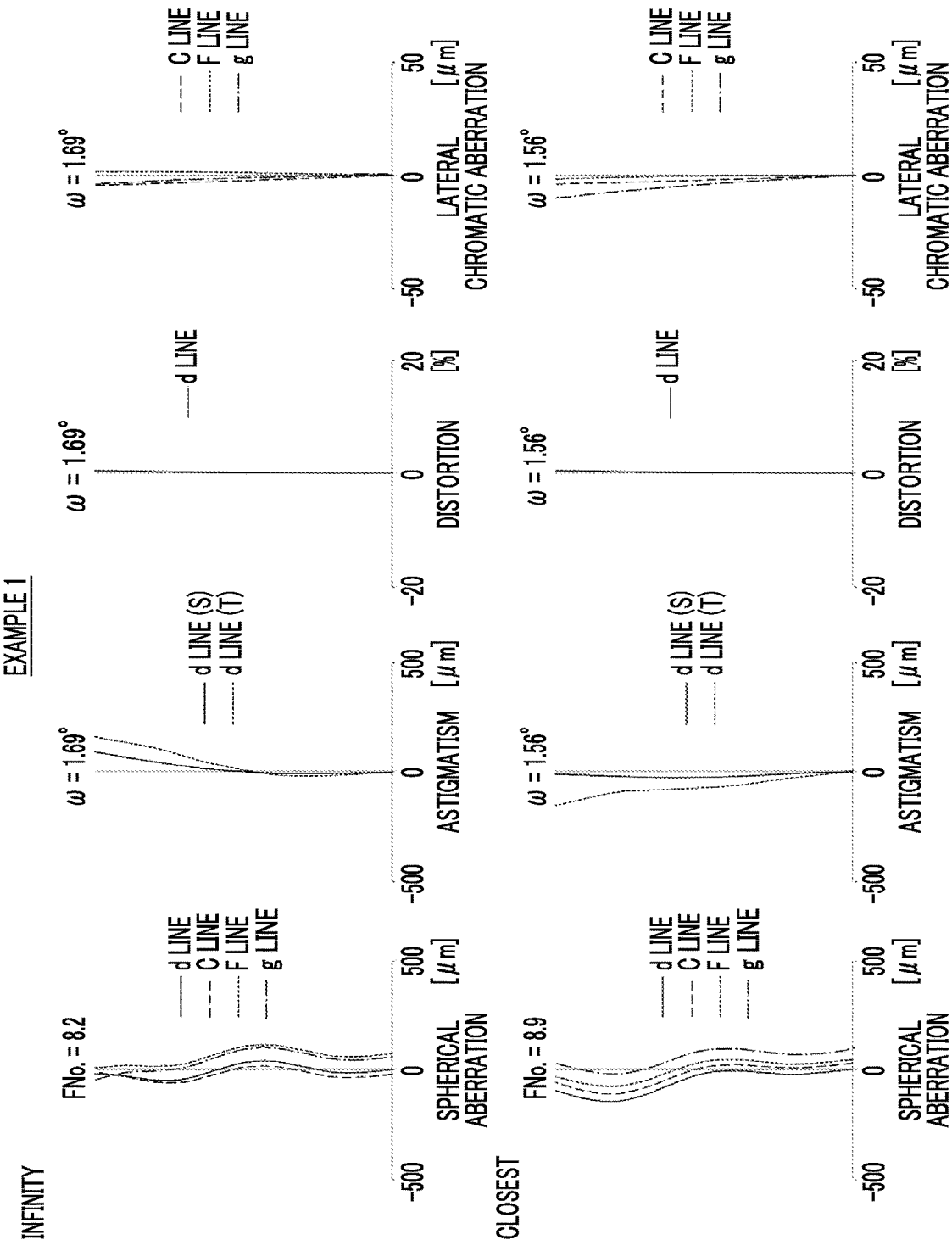
FIG. 3 is a diagram showing aberrations of the imaging lens of Example 1.

FIG. 3 shows a diagram showing aberrations of the imaging lens of Example 1. FIG. 3 shows spherical aberration, astigmatism, distortion, and lateral chromatic aberration, in order from the left side. In FIG. 3, the upper part labeled "infinity" shows aberration diagrams in a state in which the infinite distance object is in focus, and the lower part labeled "closest" shows aberration diagrams in the state in which the closest range object is in focus. In spherical aberration diagram, aberrations at the d line, the C line, the F line, and the g line are indicated by the solid line, the long broken line, the short broken line, and the chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In lateral chromatic aberration, aberrations at the C line, the F line, and the g line are respectively indicated by the long broken line, the short broken line, and the chain line. In the spherical aberration diagram, a value of the F number is shown after "FNo.=". In other aberration diagrams, a value of the maximum half angle of view is shown after "ω=".

Symbols, meanings, description methods, and illustration methods of the respective data pieces according to Example 1 are the same as those in the following examples unless otherwise specified. Therefore, in the following description, repeated description will not be given. Further, in the cross-sectional view of the following examples, the illustration of the rear group Gr will not be repeated.

Example 2

Figure 4:
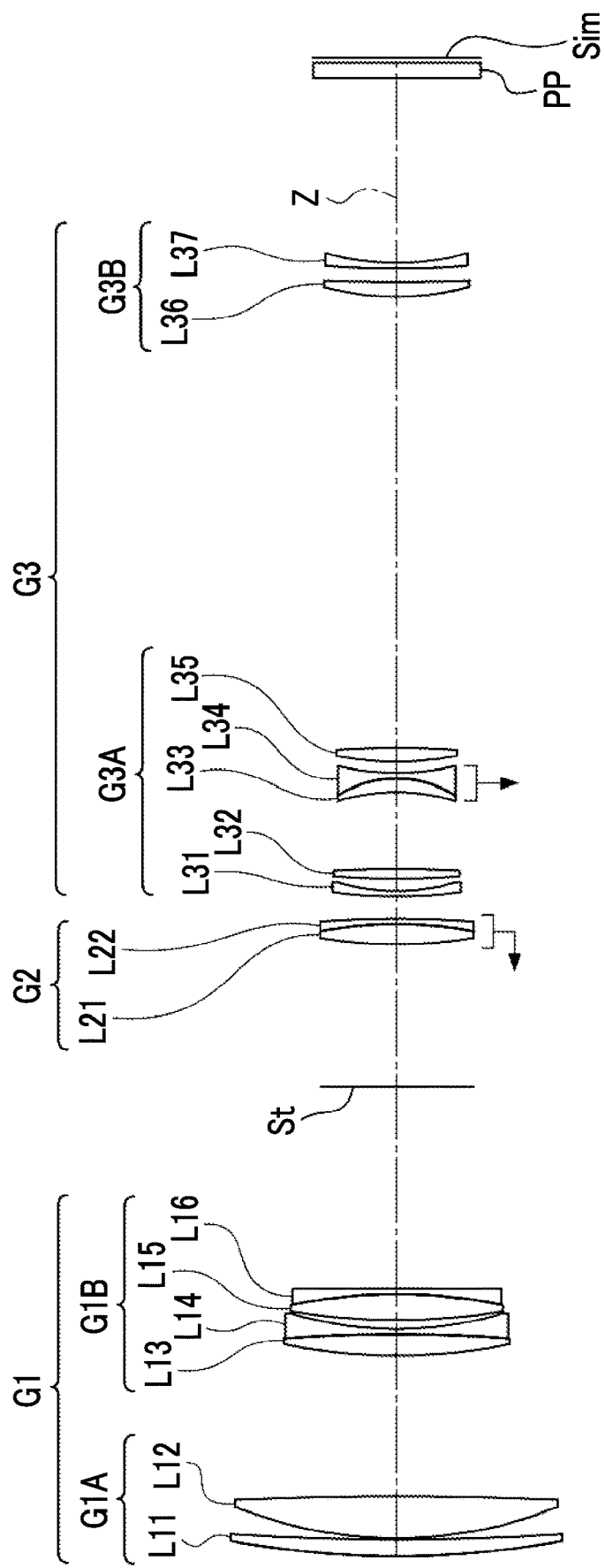
FIG. 4 is a cross-sectional view showing a configuration of an imaging lens of Example 2.

FIG. 4 is a cross-sectional view of a configuration of the imaging lens of Example 2. The imaging lens of Example 2 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A consists of lenses L11 and L12, in order from the object side to the image side. The first B lens group G1B consists of lenses L13 to L16, in order from the object side to the image side. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 and L37, in order from the object side to the image side. The vibration-proof group consists of lenses L33 and L34.

Figure 5:
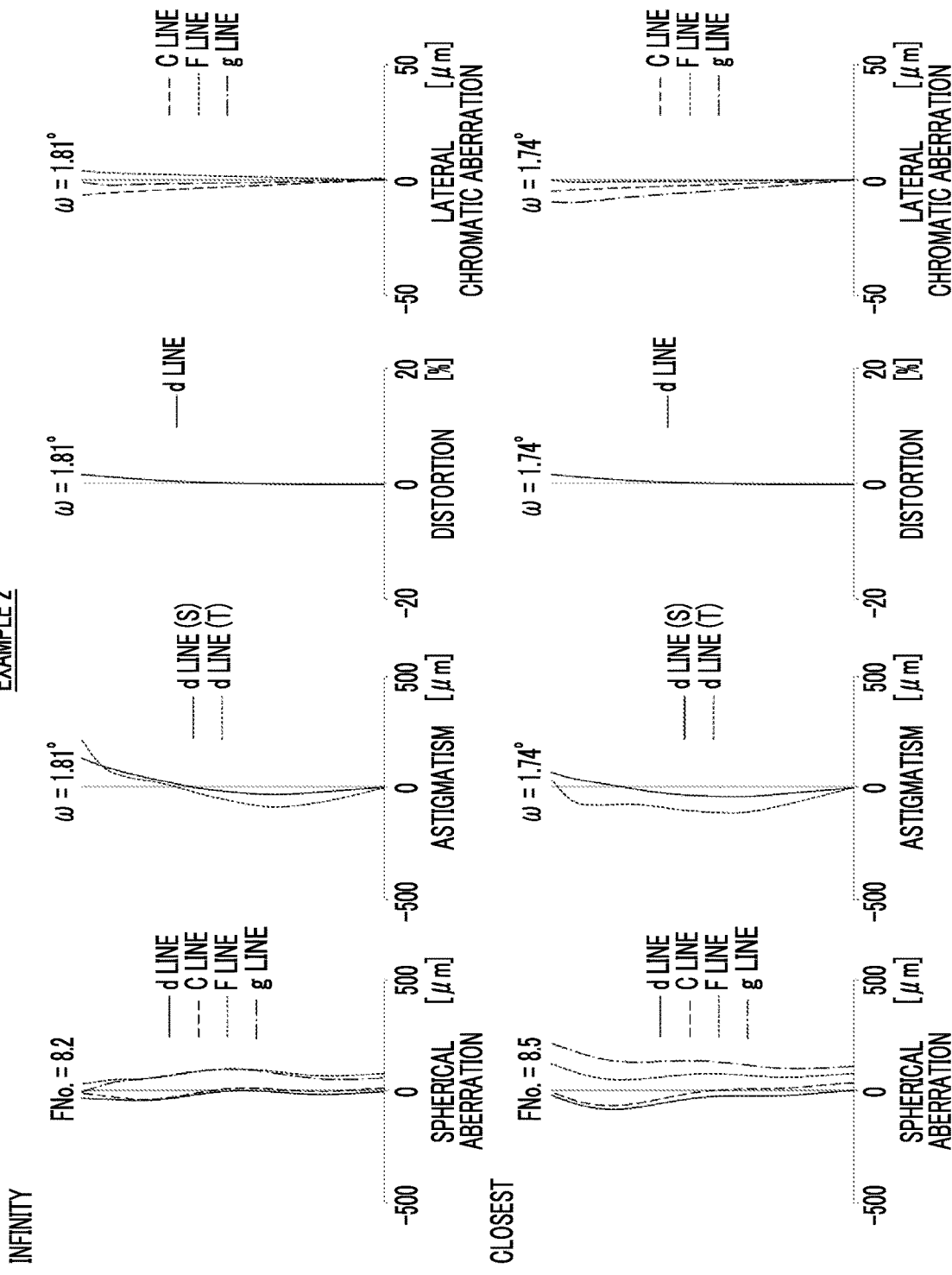
FIG. 5 is a diagram showing aberrations of the imaging lens of Example 2.

Regarding the imaging lens of Example 2, Table 4 shows basic lens data, Table 5 shows specifications and variable surface spacings, and Table 6 shows aspherical coefficients thereof. FIG. 5 shows aberration diagrams. In FIG. 5, the upper part shows aberration diagrams in a state in which the infinite distance object is in focus, and the lower part shows aberration diagrams in the state in which the closest range object is in focus. In the imaging lens of Example 2, the distance on the optical axis between the object and the image plane Sim in the state in which the closest range object is in focus is 3.2 m (meters).

TABLE 4

| Sn | R | D | Nd | νd | θgF | Material |
|---|---|---|---|---|---|---|
| 1 | 165.29116 | 3.118 | 1.76182 | 26.61 | 0.61184 | H-ZF12.CDGM |
| 2 | 462.34337 | 0.250 | | | | |
| 3 | 79.99791 | 7.722 | 1.43875 | 94.66 | 0.53402 | S-FPL55.OHARA |
| 4 | -722.19261 | 26.383 | | | | |
| 5 | 103.25703 | 4.011 | 1.49700 | 81.54 | 0.53748 | S-FPL51.OHARA |
| 6 | -288.93722 | 1.000 | 1.74100 | 52.68 | 0.54707 | H-LAK61.CDGM |
| 7 | 68.57748 | 1.675 | | | | |
| 8 | 121.52425 | 4.871 | 1.49700 | 81.54 | 0.53748 | S-FPL51.OHARA |
| 9 | -91.73266 | 1.000 | 2.00100 | 29.13 | 0.59952 | TAFD55-W.HOYA |
| 10 | -2064.06757 | 37.678 | | | | |
| 11(St) | ∞ | DD[11] | | | | |
| 12 | 88.85054 | 3.742 | 1.53172 | 48.85 | 0.56700 | H-QF6A.CDGM |
| 13 | -76.55264 | 1.000 | 1.76200 | 40.10 | 0.57655 | S-LAM55.OHARA |
| 14 | -215.08054 | DD[14] | | | | |
| 15 | 91.02453 | 1.000 | 1.95000 | 29.37 | 0.60018 | J-LASFH15.HIKARI |

TABLE 4-continued

| Sn | R | D | Nd | υd | θgF | Material |
|---|---|---|---|---|---|---|
| 16 | 39.14861 | 2.358 | | | | |
| 17 | 171.72037 | 1.759 | 1.63980 | 34.47 | 0.59294 | H-F51.CDGM |
| 18 | −228.05648 | 14.356 | | | | |
| *19 | −37.91138 | 2.420 | 1.88385 | 37.20 | 0.57769 | D-ZLAF67.CDGM |
| 20 | −21.55543 | 1.010 | 1.60300 | 65.46 | 0.54068 | H-ZPK2A.CDGM |
| 21 | 46.27060 | 2.031 | | | | |
| 22 | 58.54407 | 2.608 | 1.60342 | 38.01 | 0.58282 | H-F1.CDGM |
| 23 | −159.28131 | 84.375 | | | | |
| 24 | 50.59766 | 2.721 | 1.60342 | 38.01 | 0.58282 | H-F1.CDGM |
| 25 | 372.63168 | 2.542 | | | | |
| *26 | 356.24703 | 1.000 | 1.71300 | 53.94 | 0.54473 | M-LAC8.HOYA |
| *27 | 56.21281 | 34.656 | | | | |
| 28 | ∞ | 2.850 | 1.51680 | 64.20 | 0.53430 | BSC7.HOYA |
| 29 | ∞ | 0.915 | | | | |

TABLE 5

| | Infinity | Closest |
|---|---|---|
| f | 484.699 | 344.177 |
| Bf | 37.450 | 37.450 |
| FNo. | 8.2 | 8.5 |
| 2ω(°) | 3.62 | 3.48 |
| DD[11] | 26.633 | 15.520 |
| DD[14] | 4.212 | 15.325 |

TABLE 6

| Sn | 19 | 26 | 27 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 1.2310001E−06 | 4.9963713E−06 | 4.2913664E−06 |
| A5 | −3.1692887E−07 | 9.6612829E−08 | 3.5989360E−07 |
| A6 | 5.6101170E−08 | 9.6351569E−09 | 2.7515987E−09 |
| A7 | −1.6458538E−09 | 5.3253226E−10 | 6.5521640E−12 |
| A8 | −3.0569453E−10 | 1.1204552E−11 | 1.6607870E−11 |
| A9 | −8.0230084E−12 | −1.9995893E−13 | 2.4300791E−12 |
| A10 | 1.7915170E−12 | −5.3373723E−14 | 1.9861127E−13 |
| A11 | 6.5467919E−15 | −1.8532006E−15 | 8.4746363E−15 |
| A12 | 1.2624242E−14 | 1.4315466E−16 | −7.9861382E−16 |
| A13 | 1.2091921E−15 | 3.7933392E−17 | −1.9038800E−17 |
| A14 | −1.0981006E−16 | 5.2185800E−19 | 2.1045208E−17 |
| A15 | −1.3019794E−17 | −1.0401005E−19 | −2.9692512E−18 |
| A16 | −2.3619720E−19 | 5.6780182E−21 | −6.5726475E−20 |
| A17 | 9.3556594E−20 | 7.8724335E−21 | −1.2658965E−20 |
| A18 | −1.9423100E−20 | −2.5935500E−22 | 4.3377732E−21 |
| A19 | 2.1929154E−21 | −3.6824357E−23 | −6.0096735E−23 |
| A20 | −5.8564201E−23 | −3.9966970E−25 | −1.1074175E−23 |

Example 3

Figure 6:
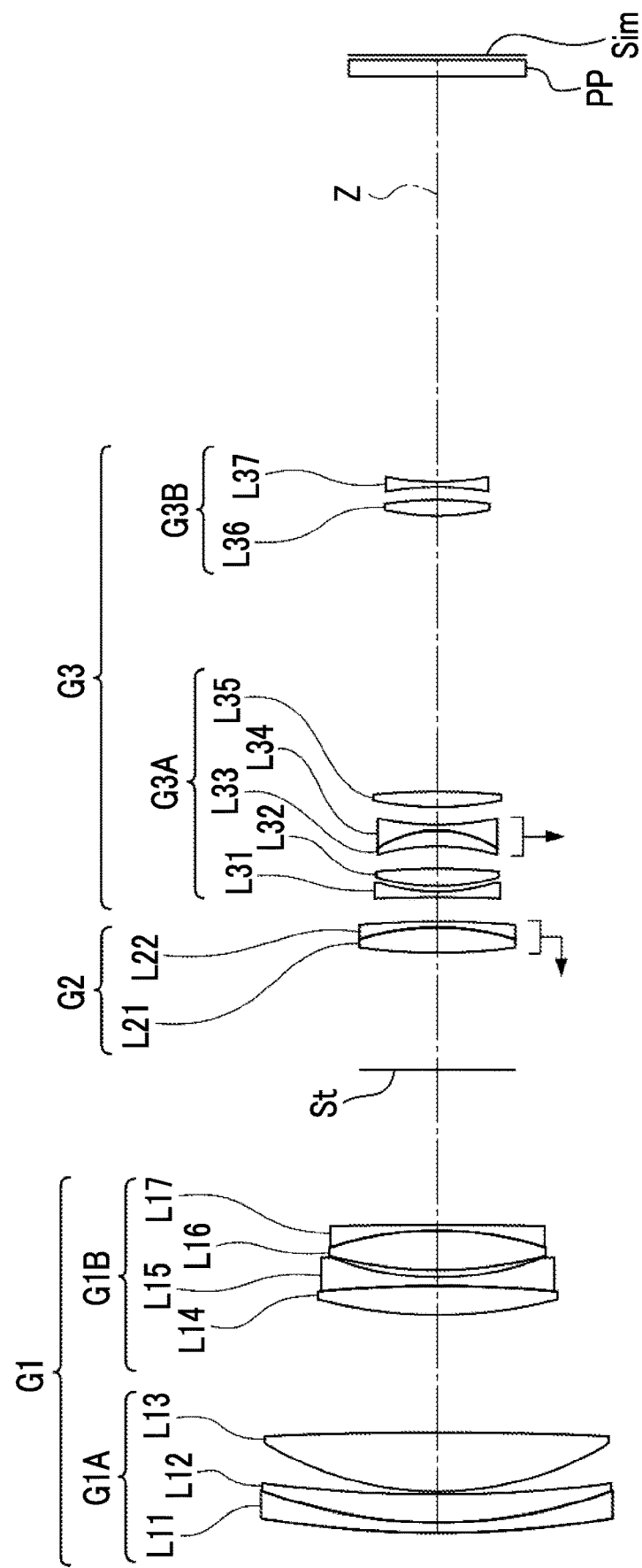
FIG. 6 is a cross-sectional view showing a configuration of an imaging lens of Example 3.

FIG. 6 is a cross-sectional view of a configuration of the imaging lens of Example 3. The imaging lens of Example 3 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A consists of lenses L11 to L13, in order from the object side to the image side. The first B lens group G1B consists of lenses L14 to L17, in order from the object side to the image side. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 and L37, in order from the object side to the image side. The vibration-proof group consists of lenses L33 and L34.

Figure 7:
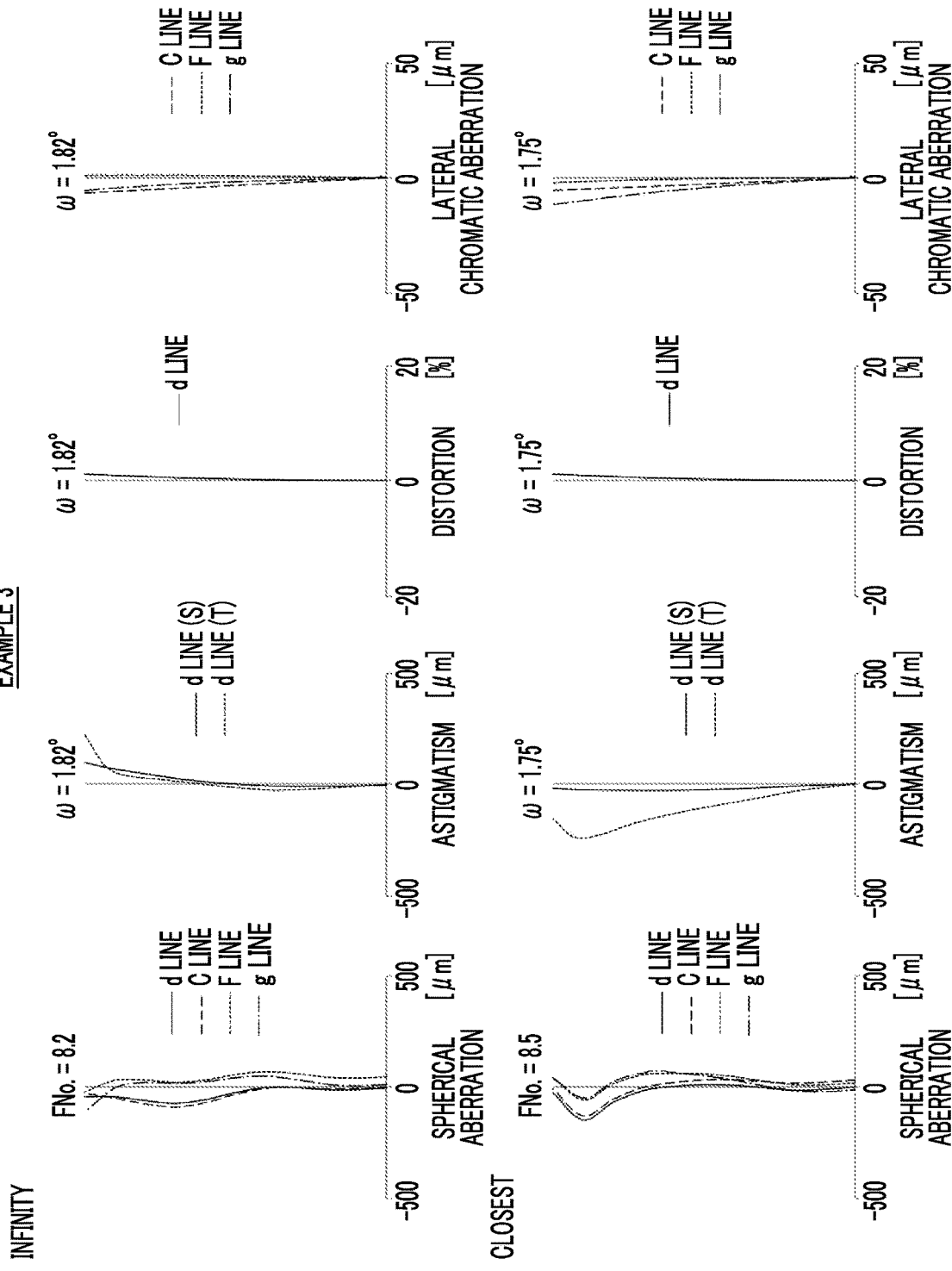
FIG. 7 is a diagram showing aberrations of the imaging lens of Example 3.

Regarding the imaging lens of Example 3, Table 7 shows basic lens data, Table 8 shows specifications and variable surface spacings, and Table 9 shows aspherical coefficients thereof. FIG. 7 shows aberration diagrams. In FIG. 7, the upper part shows aberration diagrams in a state in which the infinite distance object is in focus, and the lower part shows aberration diagrams in the state in which the closest range object is in focus. In the imaging lens of Example 3, the distance on the optical axis between the object and the image plane Sim in the state in which the closest range object is in focus is 3.2 m (meters).

TABLE 7

| Sn | R | D | Nd | υd | θgF | Material |
|---|---|---|---|---|---|---|
| 1 | 185.40472 | 1.820 | 1.62230 | 53.20 | 0.55677 | H-ZBAF1.CDGM |
| 2 | 88.38171 | 4.873 | 1.78880 | 28.43 | 0.60092 | S-NBH58.OHARA |
| 3 | 247.36545 | 0.500 | | | | |
| 4 | 57.60554 | 10.406 | 1.43875 | 94.66 | 0.53402 | S-FPL55.OHARA |
| 5 | −717.49252 | 20.748 | | | | |
| 6 | 82.15348 | 5.114 | 1.49700 | 81.54 | 0.53748 | S-FPL51.OHARA |
| 7 | −228.56794 | 1.521 | 1.74400 | 44.89 | 0.56284 | H-LAF3B.NHG |
| 8 | 53.20531 | 1.291 | | | | |
| 9 | 77.91077 | 6.872 | 1.49700 | 81.54 | 0.53748 | S-FPL51.OHARA |
| 10 | −60.71835 | 1.000 | 1.95375 | 32.31 | 0.58998 | H-ZLAF77A.NHG |
| 11 | −854.77883 | 27.236 | | | | |
| 12(St) | ∞ | DD[12] | | | | |

TABLE 7-continued

| Sn | R | D | Nd | νd | θgF | Material |
|---|---|---|---|---|---|---|
| 13 | 106.57405 | 4.450 | 1.61413 | 40.00 | 0.57872 | H-BAF7.CDGM |
| 14 | −46.56002 | 1.054 | 1.88202 | 37.22 | 0.57699 | M-TAFD3Q7.HOYA |
| *15 | −146.22834 | DD[15] | | | | |
| 16 | −276.30542 | 1.000 | 2.01960 | 21.45 | 0.63675 | K-PSFN202.SUMITA |
| 17 | 34.26269 | 1.000 | | | | |
| 18 | 40.18616 | 3.042 | 1.74077 | 27.76 | 0.60777 | E-FD13.HOYA |
| 19 | −116.17085 | 3.920 | | | | |
| *20 | −38.52311 | 2.815 | 1.86100 | 37.10 | 0.57857 | L-LAH94.OHARA |
| 21 | −18.85536 | 1.010 | 1.69680 | 55.53 | 0.54341 | S-LAL14.OHARA |
| 22 | 50.69666 | 3.092 | | | | |
| 23 | 54.77149 | 2.749 | 1.71736 | 29.51 | 0.60259 | H-ZF3.CDGM |
| 24 | −125.45463 | 48.276 | | | | |
| 25 | 42.55560 | 2.820 | 1.60342 | 38.01 | 0.58282 | H-F1.CDGM |
| 26 | −61.54863 | 2.220 | | | | |
| *27 | −51.54253 | 1.000 | 1.72903 | 54.04 | 0.54474 | M-TAC80.HOYA |
| *28 | 49.25688 | 71.387 | | | | |
| 29 | ∞ | 2.850 | 1.51680 | 64.20 | 0.53430 | BSG7.HOYA |
| 30 | ∞ | 0.901 | | | | |

TABLE 8

| | Infinity | Closest |
|---|---|---|
| f | 484.590 | 326.385 |
| Bf | 74.167 | 74.167 |
| FNo. | 8.2 | 8.5 |
| 2ω(°) | 3.64 | 3.50 |
| DD[12] | 20.655 | 9.696 |
| DD[15] | 4.288 | 15.247 |

TABLE 9

| Sn | 15 | 20 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −3.2345992E−07 | 1.9533860E−06 | 2.9763372E−06 | 3.7611326E−06 |
| A5 | 6.9439008E−09 | −2.5648083E−07 | 5.6517617E−08 | 1.0464554E−07 |
| A6 | −3.1135049E−10 | 5.3730694E−08 | 2.5617564E−09 | 1.4536482E−09 |
| A7 | −1.9888944E−11 | −2.1161565E−09 | 7.6114962E−11 | 8.6405974E−11 |
| A8 | 4.7784304E−12 | −3.3554772E−10 | 3.2032699E−12 | 4.3051044E−12 |
| A9 | −3.9924872E−13 | −8.1663091E−12 | 3.1166921E−14 | −2.5977065E−13 |
| A10 | −4.4418301E−15 | 1.9773921E−12 | −7.3863392E−14 | −1.0918522E−13 |
| A11 | 5.6054145E−16 | 6.1775015E−14 | −1.3241005E−14 | −2.7248530E−14 |
| A12 | 1.7642043E−17 | 2.1426992E−14 | −4.2314978E−15 | −2.7105547E−15 |
| A13 | −8.1870147E−18 | 2.1688605E−15 | 6.9757883E−17 | 6.4447174E−16 |
| A14 | −6.3980695E−19 | −9.9302668E−17 | −9.7361405E−18 | 9.7540698E−17 |
| A15 | 1.5699176E−19 | −8.1236384E−17 | 2.1567473E−19 | −2.8614368E−18 |
| A16 | −2.1855476E−21 | 2.0275038E−18 | 1.3264337E−18 | −4.0260645E−19 |
| A17 | −1.8107084E−21 | 2.2662426E−19 | 1.7181423E−19 | −8.8792650E−20 |
| A18 | 1.6092092E−22 | 9.8559176E−21 | −1.6948680E−20 | −8.1283858E−21 |
| A19 | 6.4201372E−24 | 1.7124911E−21 | −1.3825730E−21 | 3.1410459E−22 |
| A20 | −7.0536342E−25 | −2.0114648E−22 | 2.5691964E−22 | 4.6201497E−22 |

Example 4

Figure 8:
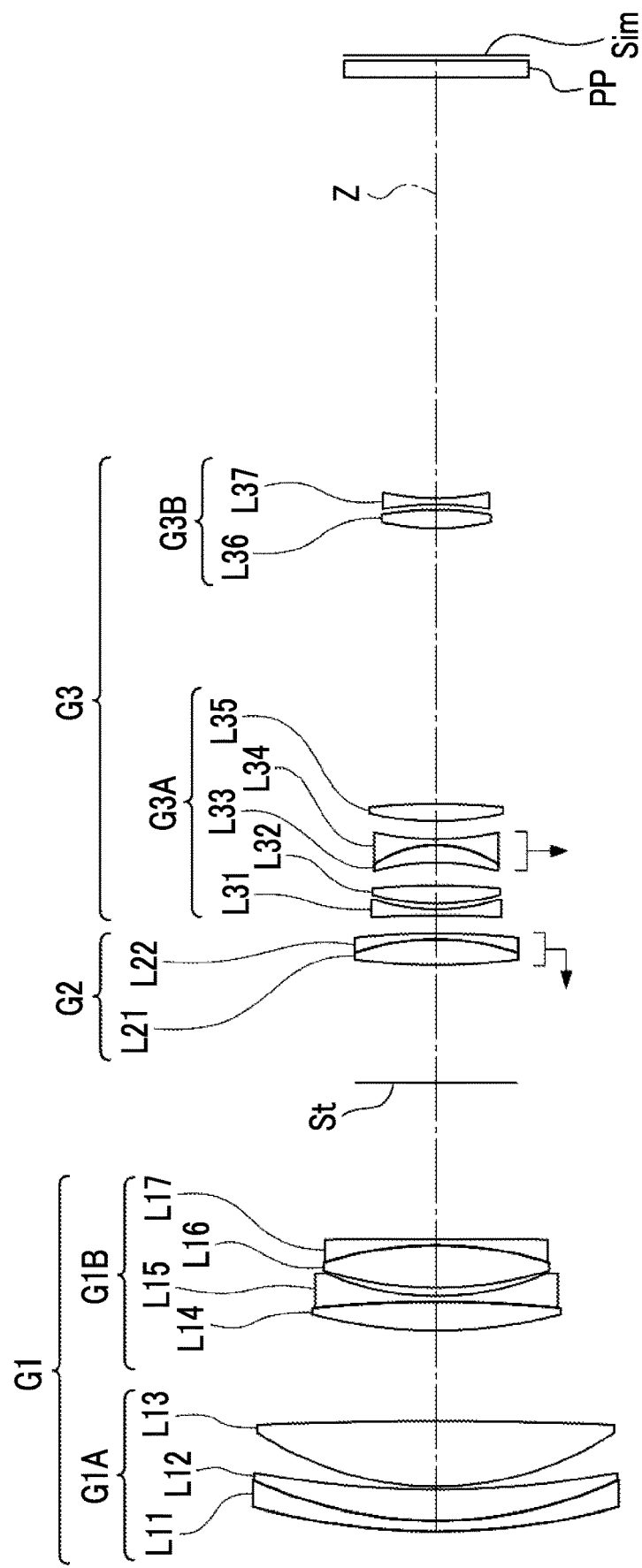
FIG. 8 is a cross-sectional view showing a configuration of an imaging lens of Example 4.

FIG. 8 is a cross-sectional view of a configuration of the imaging lens of Example 4. The imaging lens of Example 4 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A consists of lenses L11 to L13, in order from the object side to the image side. The first B lens group G1B consists of lenses L14 to L17, in order from the object side to the image side. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 and L37, in order from the object side to the image side. The vibration-proof group consists of lenses L33 and L34.

Figure 9:
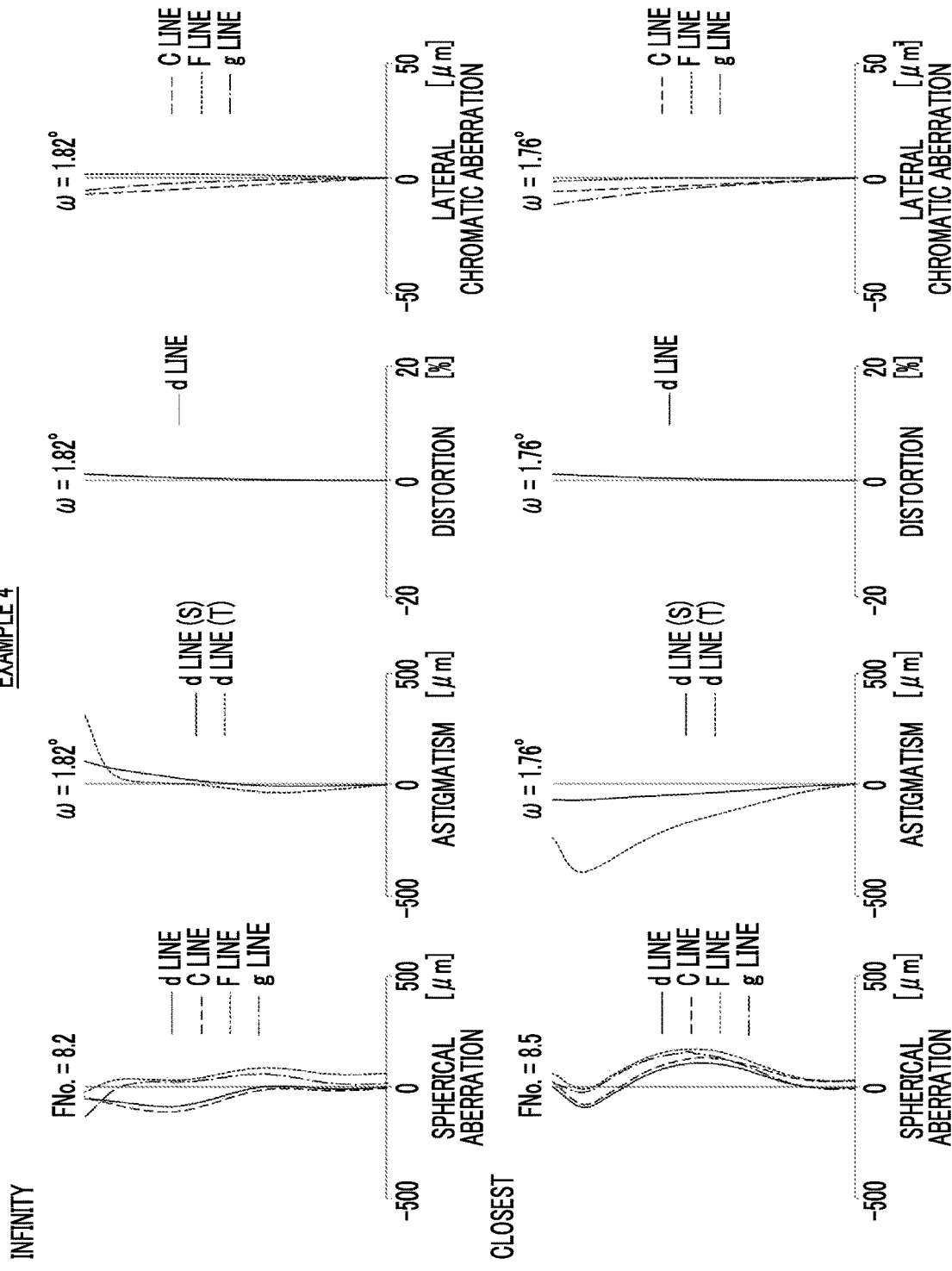
FIG. 9 is a diagram showing aberrations of the imaging lens of Example 4.

Regarding the imaging lens of Example 4, Table 10 shows basic lens data, Table 11 shows specifications and variable surface spacings, and Table 12 shows aspherical coefficients thereof. FIG. 9 shows aberration diagrams. In FIG. 9, the upper part shows aberration diagrams in a state in which the infinite distance object is in focus, and the lower part shows aberration diagrams in the state in which the closest range object is in focus. In the imaging lens of Example 4, the distance on the optical axis between the object and the image plane Sim in the state in which the closest range object is in focus is 3.2 m (meters).

TABLE 10

| Sn | R | D | Nd | νd | θgF | Material |
|---|---|---|---|---|---|---|
| 1 | 116.95962 | 1.820 | 1.62230 | 53.20 | 0.55677 | H-ZBAF1.CDGM |
| 2 | 72.65796 | 5.213 | 1.78880 | 28.43 | 0.60092 | S-NBH58.OHARA |
| 3 | 165.69621 | 0.500 | | | | |
| 4 | 53.94690 | 11.081 | 1.43875 | 94.66 | 0.53402 | S-FPL55.OHARA |
| 5 | −728.47996 | 15.443 | | | | |
| 6 | 83.21011 | 4.824 | 1.49700 | 81.54 | 0.53748 | S-FPL51.OHARA |
| 7 | −220.46326 | 1.000 | 1.74400 | 44.89 | 0.56284 | H-LAF3B.NHG |
| 8 | 46.98049 | 1.450 | | | | |
| 9 | 64.94271 | 7.096 | 1.49700 | 81.54 | 0.53748 | S-FPL51.OHARA |
| 10 | −62.06779 | 1.000 | 1.95375 | 32.31 | 0.58998 | H-ZLAF77A.NHG |
| 11 | −2619.53574 | 26.698 | | | | |
| 12(St) | ∞ | DD[12] | | | | |
| 13 | 103.79521 | 4.337 | 1.61413 | 40.00 | 0.57872 | H-BAF7.CDGM |
| 14 | −41.96013 | 1.000 | 1.88202 | 37.22 | 0.57699 | M-TAFD307.HOYA |
| *15 | −136.34103 | DD[15] | | | | |
| 16 | −202.18659 | 1.000 | 2.01960 | 21.45 | 0.63675 | K-PSFN202.SUMITA |
| 17 | 33.55018 | 1.000 | | | | |
| 18 | 41.14750 | 3.041 | 1.74077 | 27.76 | 0.60777 | E-FD13.HOYA |
| 19 | −108.57080 | 3.869 | | | | |
| *20 | −40.05056 | 3.015 | 1.86100 | 37.10 | 0.57857 | L-LAH94.OHARA |
| 21 | −18.20497 | 1.010 | 1.69680 | 55.53 | 0.54341 | S-LAL14.OHARA |
| 22 | 48.04218 | 3.051 | | | | |
| 23 | 50.01594 | 2.905 | 1.71736 | 29.51 | 0.60259 | H-ZF3.CDGM |
| 24 | −116.27807 | 46.613 | | | | |
| 25 | 41.28704 | 2.971 | 1.60342 | 38.01 | 0.58282 | H-F1.CDGM |
| 26 | −52.85698 | 1.003 | | | | |
| *27 | −45.30116 | 1.000 | 1.72903 | 54.04 | 0.54474 | M-TAC80.HOYA |
| *28 | 45.32915 | 71.387 | | | | |
| 29 | ∞ | 2.850 | 1.51680 | 64.20 | 0.53430 | BSG7.HOYA |
| 30 | ∞ | 0.907 | | | | |

TABLE 11

| | Infinity | Closest |
|---|---|---|
| f | 484.570 | 321.685 |
| Bf | 74.173 | 74.173 |
| FNo. | 8.2 | 8.5 |
| 2ω(°) | 3.64 | 3.52 |
| DD[12] | 19.832 | 9.320 |
| DD[15] | 3.091 | 13.603 |

TABLE 12

| Sn | 15 | 20 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −3.7418222E−07 | 1.3101668E−06 | 5.0245534E−06 | 4.4278513E−06 |
| A5 | 8.7970810E−09 | −2.6405023E−07 | 6.6275620E−08 | 1.5270597E−07 |
| A6 | −1.0732301E−09 | 5.3293497E−08 | 4.2967933E−09 | 1.0887032E−09 |
| A7 | −2.9365013E−11 | −2.1794087E−09 | 2.8683789E−11 | 1.8939101E−10 |
| A8 | 5.1196407E−12 | −3.3655739E−10 | 1.5903809E−12 | 1.1379491E−11 |
| A9 | −3.6920194E−13 | −7.9635859E−12 | 4.3624945E−13 | 7.4143660E−14 |
| A10 | −1.8110790E−15 | 2.0030643E−12 | 4.4868894E−14 | −1.1972586E−13 |
| A11 | 8.3715559E−16 | 6.3533297E−14 | 8.8700412E−15 | −3.4264014E−14 |
| A12 | 3.9727656E−17 | 2.1353974E−14 | −9.5804711E−16 | −3.4919214E−15 |
| A13 | −6.7477332E−18 | 2.1194082E−15 | 5.1114224E−16 | 5.7223295E−16 |
| A14 | −5.7618651E−19 | −1.0345907E−16 | −1.8647397E−17 | 1.2514907E−16 |
| A15 | 1.5437966E−19 | −8.1373540E−17 | −2.5397318E−18 | 2.8323171E−18 |
| A16 | −1.9504280E−21 | 2.0937352E−18 | 4.0101805E−19 | 1.4011707E−18 |
| A17 | −1.8681474E−21 | 2.2999648E−19 | −6.5668278E−20 | −6.3140199E−20 |
| A18 | 1.4810880E−22 | 9.4099255E−21 | −6.9807525E−21 | −5.2939978E−21 |
| A19 | 6.3254031E−24 | 1.8091349E−21 | −2.1232098E−21 | 8.0227523E−23 |
| A20 | −6.6797294E−25 | −2.0879582E−22 | 3.8129434E−22 | −1.9017918E−22 |

Example 5

Figure 10:
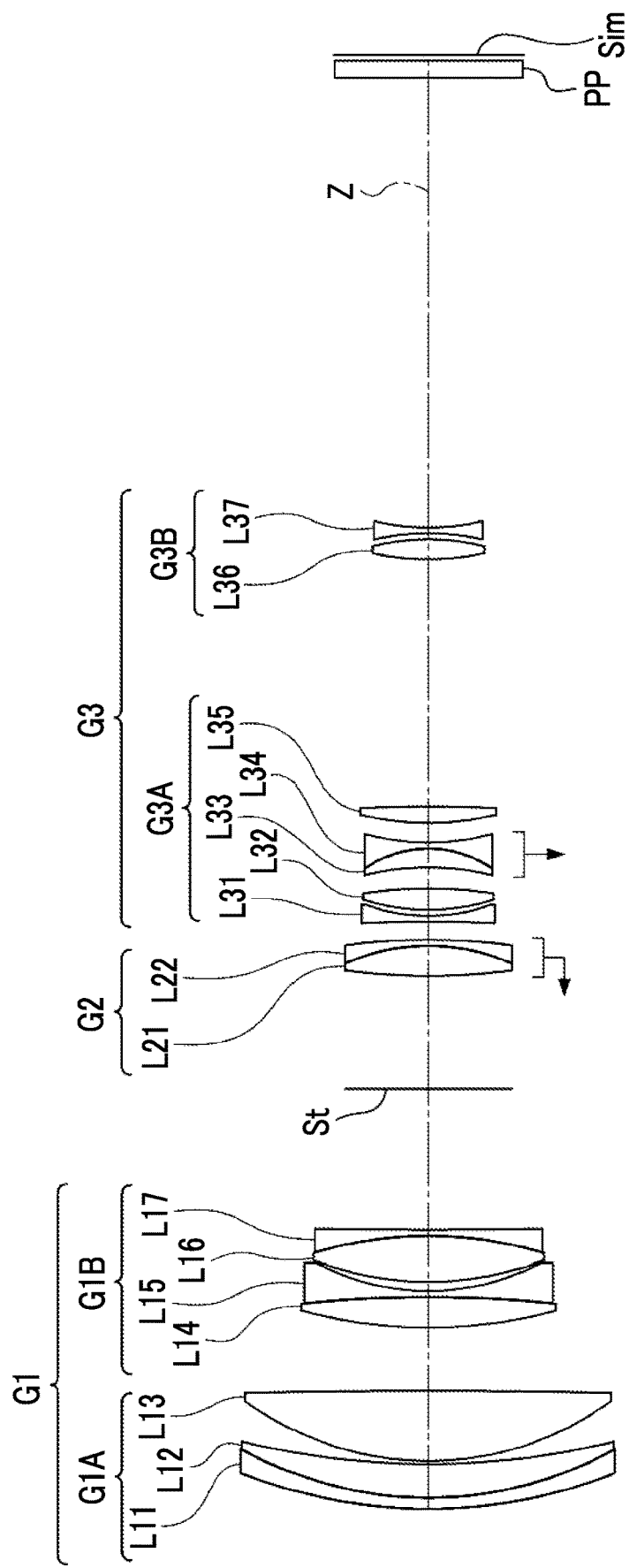
FIG. 10 is a cross-sectional view showing a configuration of an imaging lens of Example 5.

FIG. 10 is a cross-sectional view of a configuration of the imaging lens of Example 5. The imaging lens of Example 5 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A consists of lenses L11 to L13, in order from the object side to the image side. The first B lens group G1B consists of lenses L14 to L17, in order from the object side to the image side. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 and L37, in order from the object side to the image side. The vibration-proof group consists of lenses L33 and L34.

Figure 11:
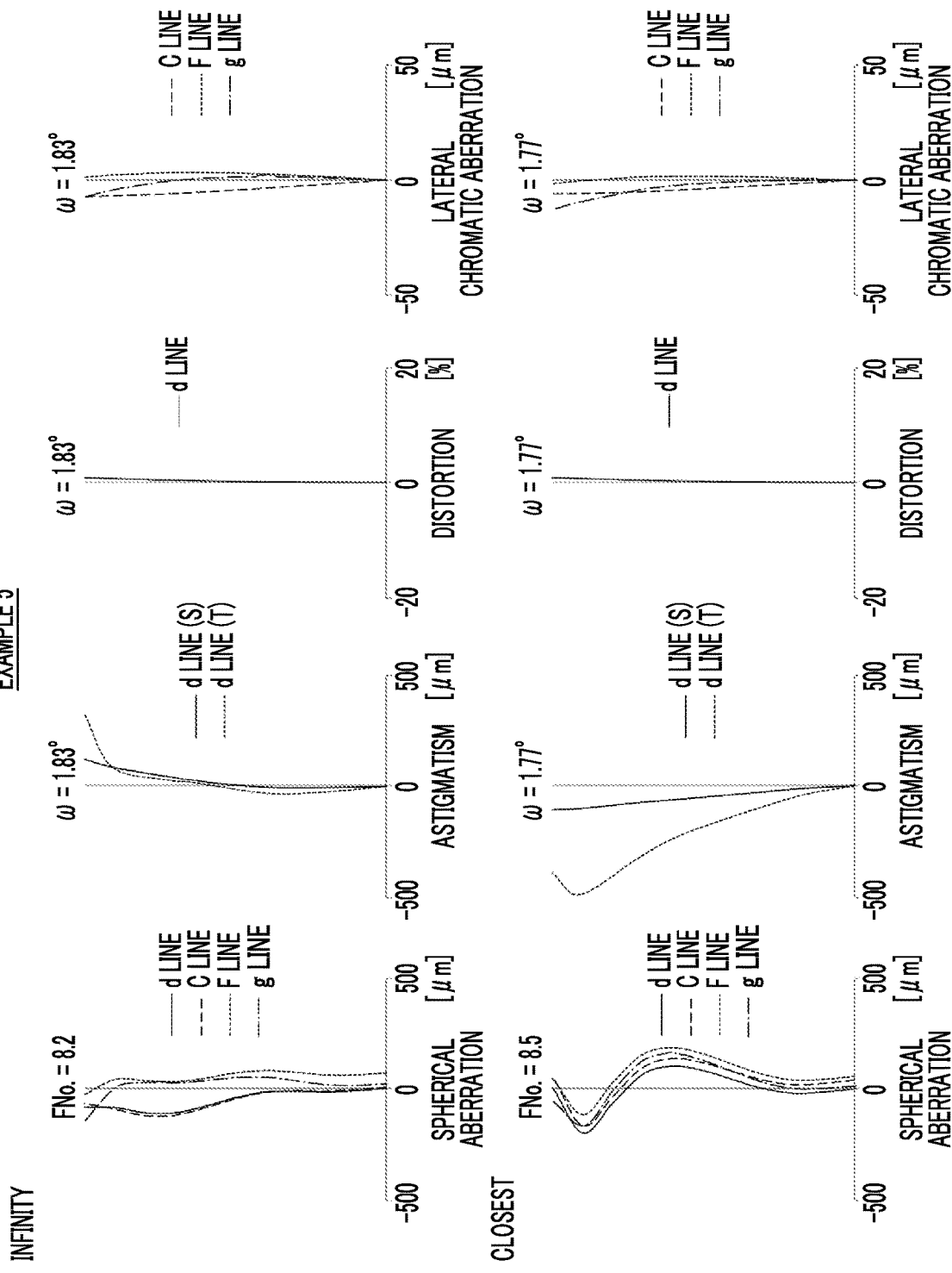
FIG. 11 is a diagram showing aberrations of the imaging lens of Example 5.

Regarding the imaging lens of Example 5, Table 13 shows basic lens data, Table 14 shows specifications and variable surface spacings, and Table 15 shows aspherical coefficients thereof. FIG. 11 shows aberration diagrams. In FIG. 11, the upper part shows aberration diagrams in a state in which the infinite distance object is in focus, and the lower part shows aberration diagrams in the state in which the closest range object is in focus. In the imaging lens of Example 5, the distance on the optical axis between the object and the image plane Sim in the state in which the closest range object is in focus is 3.3 m (meters).

TABLE 13

| Sn | R | D | Nd | νd | θgF | Material |
|---|---|---|---|---|---|---|
| 1 | 82.93481 | 1.820 | 1.62230 | 53.20 | 0.55677 | H-ZBAF1.CDGM |
| 2 | 62.45881 | 5.589 | 1.78880 | 28.43 | 0.60092 | S-NBH58.OHARA |
| 3 | 127.58828 | 0.500 | | | | |
| 4 | 50.40784 | 11.608 | 1.43875 | 94.66 | 0.53402 | S-FPL55.OHARA |
| 5 | −1272.04841 | 10.474 | | | | |
| 6 | 78.62246 | 5.064 | 1.49700 | 81.54 | 0.53748 | S-FPL51.OHARA |
| 7 | −205.09247 | 1.000 | 1.74400 | 44.89 | 0.56284 | H-LAF3B.NHG |
| 8 | 39.16123 | 1.516 | | | | |
| 9 | 52.28875 | 7.520 | 1.49700 | 81.54 | 0.53748 | S-FPL51.OHARA |
| 10 | −65.79529 | 1.000 | 1.95375 | 32.31 | 0.58998 | H-ZLAF77A.NHG |
| 11 | 946.45814 | 23.315 | | | | |
| 12(St) | ∞ | DD[12] | | | | |
| 13 | 105.13591 | 4.927 | 1.61413 | 40.00 | 0.57872 | H-BAF7.CDGM |
| 14 | −33.91517 | 1.000 | 1.88202 | 37.22 | 0.57699 | M-TAFD307.HOYA |
| *15 | −106.34532 | DD[15] | | | | |
| 16 | −220.77327 | 1.000 | 2.01960 | 21.45 | 0.63675 | K-PSFN202.SUMITA |
| 17 | 30.37201 | 1.000 | | | | |
| 18 | 35.96465 | 3.492 | 1.74077 | 27.76 | 0.60777 | E-FD13.HOYA |
| 19 | −76.09370 | 3.537 | | | | |
| *20 | −43.50278 | 3.094 | 1.86100 | 37.10 | 0.57857 | L-LAH94.OHARA |
| 21 | −18.37009 | 1.010 | 1.69680 | 55.53 | 0.54341 | S-LAL14.OHARA |
| 22 | 39.13997 | 3.247 | | | | |
| 23 | 46.84738 | 2.684 | 1.71736 | 29.51 | 0.60259 | H-ZF3.CDGM |
| 24 | −264.95413 | 40.699 | | | | |
| 25 | 41.03167 | 3.307 | 1.60342 | 38.01 | 0.58282 | H-F1.CDGM |
| 26 | −38.12174 | 1.000 | | | | |
| *27 | −38.54195 | 1.000 | 1.72903 | 54.04 | 0.54474 | M-TAC80.HOYA |
| *28 | 40.96188 | 74.338 | | | | |
| 29 | ∞ | 2.850 | 1.51680 | 64.20 | 0.53430 | BSG7.HOYA |
| 30 | ∞ | 0.868 | | | | |

TABLE 14

|  | Infinity | Closest |
|---|---|---|
| f | 484.402 | 319.936 |
| Bf | 77.085 | 77.085 |
| FNo. | 8.2 | 8.5 |
| 2ω(°) | 3.66 | 3.54 |
| DD[12] | 18.708 | 9.199 |
| DD[15] | 2.997 | 12.506 |

TABLE 15

| Sn | 15 | 20 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −8.4837416E−07 | 8.2689441E−07 | 4.3863034E−06 | 3.8381302E−06 |
| A5 | 2.1733055E−08 | −2.3422452E−07 | 5.2959483E−09 | 1.4329595E−07 |
| A6 | −1.5505047E−09 | 5.1800107E−08 | 4.4034342E−09 | −1.0028179E−09 |
| A7 | −4.5557389E−11 | −2.2387610E−09 | −1.0400571E−11 | 1.4945865E−10 |
| A8 | 5.6089648E−12 | −3.2441163E−10 | 2.3889832E−12 | 6.1636813E−12 |
| A9 | −4.1783212E−13 | −5.7876840E−12 | 1.0635949E−13 | −8.4940829E−14 |
| A10 | −1.8560520E−14 | 2.1059829E−12 | −5.5599539E−14 | −5.9475038E−14 |
| A11 | −1.1082740E−15 | 4.0415486E−14 | −3.9291057E−15 | −2.4025306E−14 |
| A12 | −6.1084997E−17 | 1.5254055E−14 | −4.1111860E−15 | −3.7018085E−15 |
| A13 | −3.2853569E−18 | 1.4111376E−15 | 2.5627180E−I6 | 2.8983808E−16 |
| A14 | 5.3784727E−19 | 3.6699211E−18 | 7.0402587E−I8 | −1.4633059E−17 |
| A15 | 3.2203541E−19 | −8.2499089E−17 | −1.5464610E−18 | 2.0168037E−17 |
| A16 | 6.8692585E−21 | 2.2339579E−18 | −2.5992702E−18 | 5.7649725E−19 |
| A17 | −2.5093142E−21 | 2.5184574E−19 | 4.0834356E−20 | 1.6897700E−19 |
| A18 | 3.4018058E−23 | 1.3991245E−20 | 3.4539563E−21 | −3.5714361E−20 |
| A19 | 2.5480536E−24 | 1.3554425E−21 | 2.4584384E−21 | −2.0027437E−22 |
| A20 | −8.7313483E−26 | −2.2765574E−22 | 1.5515094E−22 | 5.0052836E−23 |

Example 6

Figure 12:
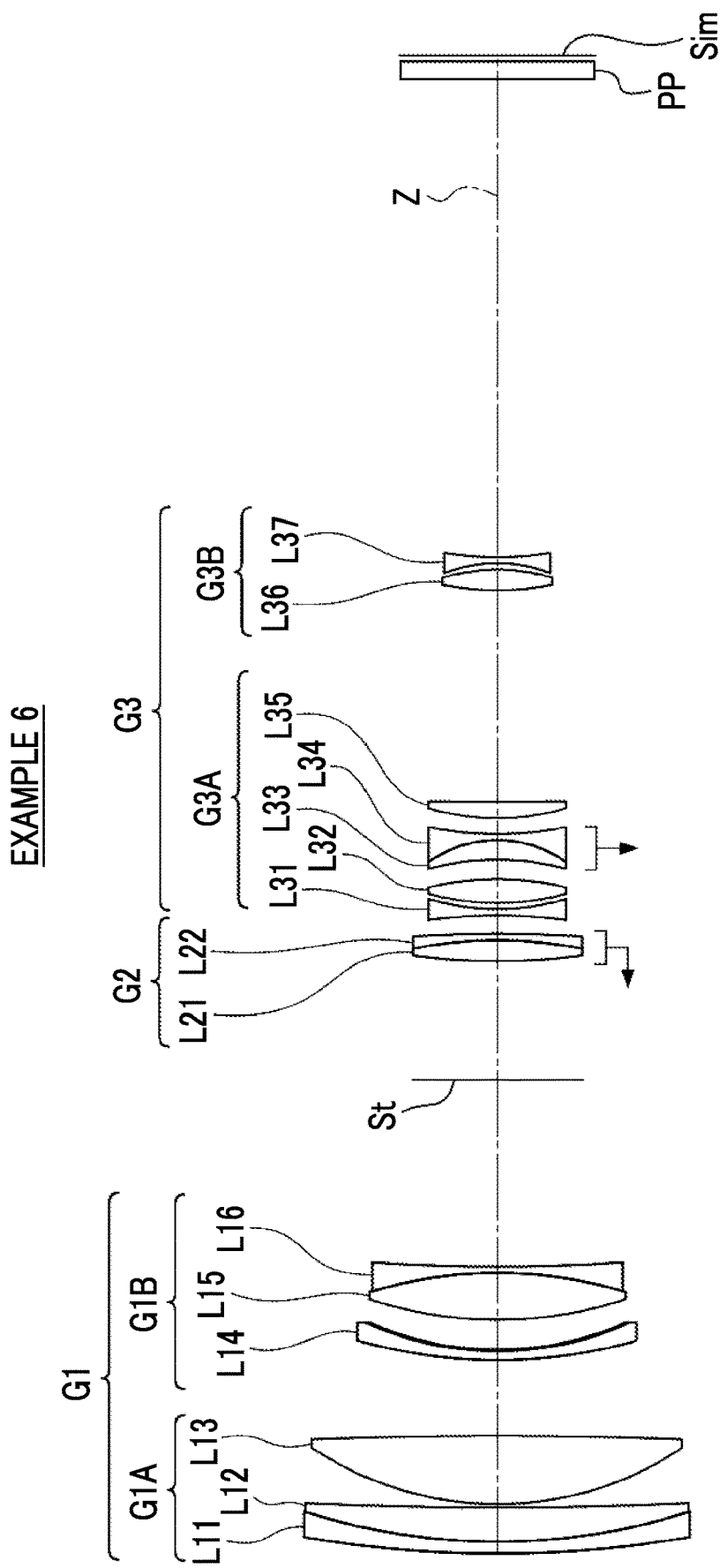
FIG. 12 is a cross-sectional view showing a configuration of an imaging lens of Example 6.

FIG. 12 is a cross-sectional view of a configuration of the imaging lens of Example 6. The imaging lens of Example 6 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A consists of lenses L11 to L13, in order from the object side to the image side. The first B lens group G1B consists of lenses L14 to L16, in order from the object side to the image side. The lens L14 is a compound aspherical lens. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 and L37, in order from the object side to the image side. The vibration-proof group consists of lenses L33 and L34.

Figure 13:
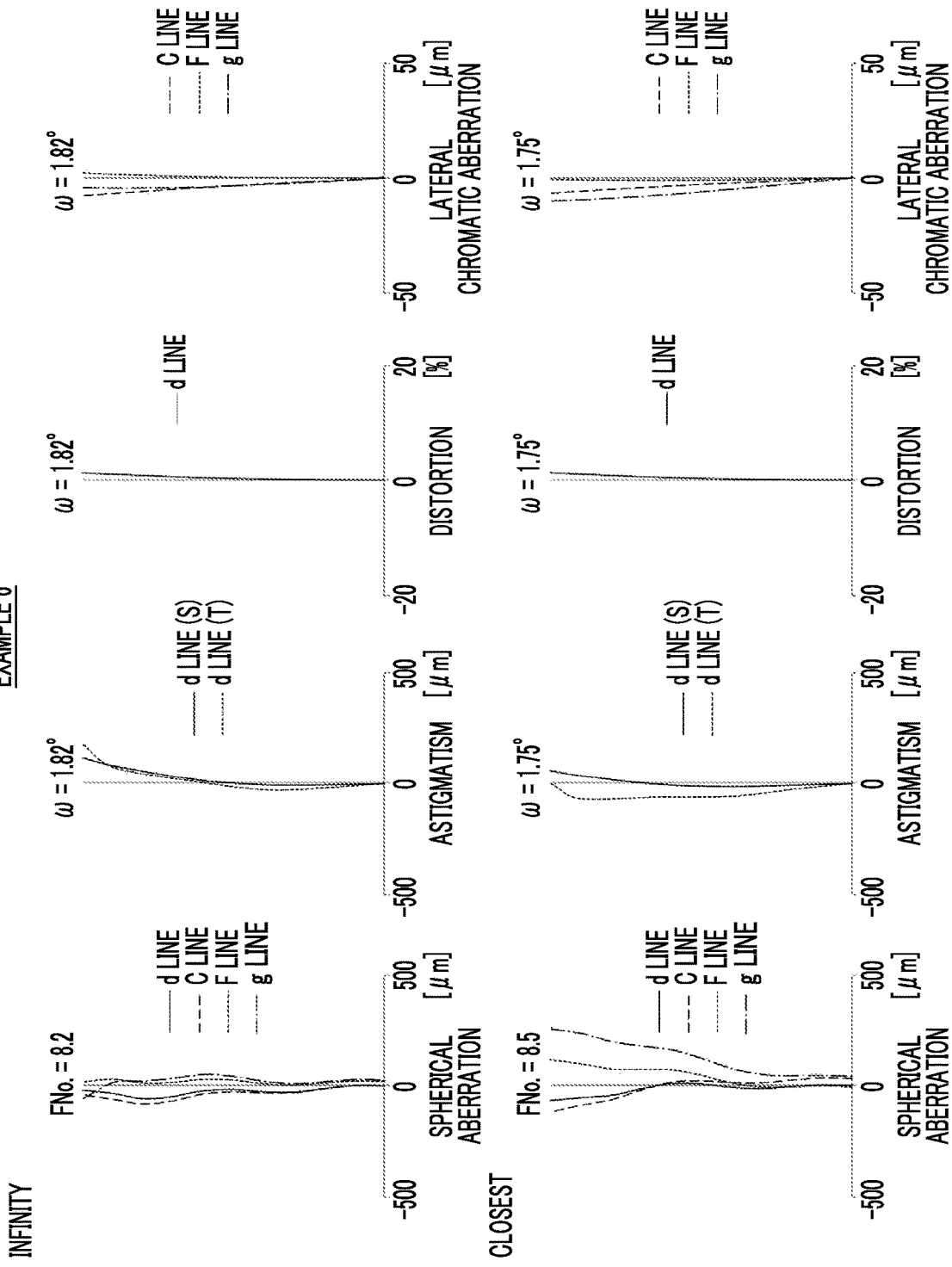
FIG. 13 is a diagram showing aberrations of the imaging lens of Example 6.

Regarding the imaging lens of Example 6, Table 16 shows basic lens data, Table 17 shows specifications and variable surface spacings, and Table 18 shows aspherical coefficients thereof. FIG. 13 shows aberration diagrams. In FIG. 13, the upper part shows aberration diagrams in a state in which the infinite distance object is in focus, and the lower part shows aberration diagrams in the state in which the closest range object is in focus. In the imaging lens of Example 6, the distance on the optical axis between the object and the image plane Sim in the state in which the closest range object is in focus is 3.3 m (meters).

TABLE 16

| Sn | R | D | Nd | υd | θgF | Material |
|---|---|---|---|---|---|---|
| 1 | 186.86786 | 1.820 | 1.79952 | 42.09 | 0.56678 | J-LASF02.HIKARI |
| 2 | 98.74069 | 5.493 | 1.80519 | 25.48 | 0.61354 | H-ZF7LA.CDGM |
| 3 | 695.76244 | 0.500 | | | | |
| 4 | 52.59751 | 10.980 | 1.43875 | 94.66 | 0.53402 | S-FPL55.OHARA |
| 5 | −754.67380 | 12.245 | | | | |
| 6 | 82.64589 | 1.390 | 1.85545 | 36.60 | 0.57920 | H-ZLAF3.CDGM |
| 7 | 50.67734 | 0.250 | 1.59833 | 20.31 | 0.83392 | |
| *8 | 50.02446 | 4.825 | | | | |
| 9 | 65.66566 | 7.520 | 1.49700 | 81.54 | 0.53748 | S-FPL51.OHARA |
| 10 | −69.44519 | 1.000 | 2.00100 | 29.13 | 0.59952 | TAFD55-W.HOYA |
| 11 | 293.09499 | 29.821 | | | | |
| 12(St) | ∞ | DD[12] | | | | |

TABLE 16-continued

| Sn | R | D | Nd | υd | θgF | Material |
|---|---|---|---|---|---|---|
| 13 | 100.24336 | 3.382 | 1.54814 | 45.83 | 0.56849 | H-QF1.CDGM |
| 14 | −67.01471 | 1.000 | 1.80166 | 44.28 | 0.56255 | H-ZLAF1.CDGM |
| 15 | −210.91109 | DD[15] | | | | |
| 16 | −78.86283 | 1.000 | 2.01960 | 21.45 | 0.63675 | K-PSFN202.SUMITA |
| 17 | 38.02108 | 1.000 | | | | |
| 18 | 43.20132 | 3.801 | 1.76182 | 26.61 | 0.61184 | H-ZF12.CDGM |
| 19 | −47.60823 | 3.123 | | | | |
| *20 | −42.73648 | 3.173 | 1.88660 | 34.95 | 0.58238 | K-VC91.SUMITA |
| 21 | −18.91263 | 1.010 | 1.75500 | 52.33 | 0.54859 | H-L.AK53A.CDGM |
| 22 | 55.68201 | 2.516 | | | | |
| 23 | 38.55288 | 2.614 | 1.69895 | 30.05 | 0.60174 | H-ZF11.CDGM |
| 24 | 977.98366 | 33.980 | | | | |
| 25 | 42.34394 | 3.353 | 1.60342 | 38.01 | 0.58282 | H-F1.CDGM |
| 26 | −29.36600 | 1.000 | | | | |
| *27 | −23.12774 | 1.000 | 1.72903 | 54.04 | 0.54474 | M-TAC80.HOYA |
| *28 | 59.14514 | 76.602 | | | | |
| 29 | ∞ | 2.850 | 1.51680 | 64.20 | 0.53430 | BSG7.HOYA |
| 30 | ∞ | 0.941 | | | | |

TABLE 17

| | Infinity | Closest |
|---|---|---|
| f | 484.729 | 314.155 |
| Bf | 79.422 | 79.422 |
| FNo. | 8.2 | 8.5 |
| 2ω(°) | 3.64 | 3.50 |
| DD[12] | 19.027 | 8.223 |
| DD[15] | 2.995 | 13.799 |

TABLE 18

| Sn | 8 | 20 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 7.4908539E−10 | 1.2810008E−06 | 9.7073409E−06 | 4.8402560E−06 |
| A5 | −4.2883002E−09 | 3.5691670E−08 | 2.9475306E−08 | 2.0056963E−07 |
| A6 | 6.4152608E−10 | −2.7049482E−09 | 1.0074818E−08 | −7.1510820E−09 |
| A7 | −3.7785271E−11 | 9.4150239E−11 | 4.1770659E−11 | 8.2083414E−11 |
| A8 | 1.3492319E−12 | −5.2430482E−12 | 4.2149681E−11 | 1.9845772E−11 |
| A9 | −5.5278996E−14 | −3.4302416E−12 | 8.5881506E−12 | −4.2077361E−12 |
| A10 | 4.3336242E−16 | −4.3376566E−13 | 9.3466919E−13 | −1.8166421E−13 |
| A11 | 7.2440013E−17 | −2.2372188E−14 | 5.9675232E−16 | 9.9391025E−14 |
| A12 | −1.5985966E−18 | 2.1985279E−15 | −1.6748575E−14 | 3.3077475E−14 |
| A13 | 1.1763840E−19 | 6.4452599E−16 | −2.7109599E−15 | 3.7207273E−15 |
| A14 | −5.4710202E−21 | 5.8329039E−17 | 3.4201763E−17 | 2.6419753E−16 |
| A15 | −4.8645179E−23 | −3.7715668E−18 | −3.4303968E−17 | −2.4109272E−17 |
| A16 | −9.9889550E−24 | −3.2255058E−19 | 1.2443716E−17 | −1.5378187E−17 |
| A17 | 3.7873529E−25 | −3.1398121E−20 | 1.9059487E−19 | 2.2441352E−19 |
| A18 | 1.6114247E−26 | 4.7807250E−21 | −1.1324981E−21 | −7.6587810E−20 |
| A19 | 1.2402294E−29 | −5.8115417E−22 | −1.2951123E−20 | 4.6708343E−22 |
| A20 | −1.8803066E−29 | 3.5286813E−23 | −5.6878964E−23 | 1.2154356E−21 |

Example 7

Figure 14:
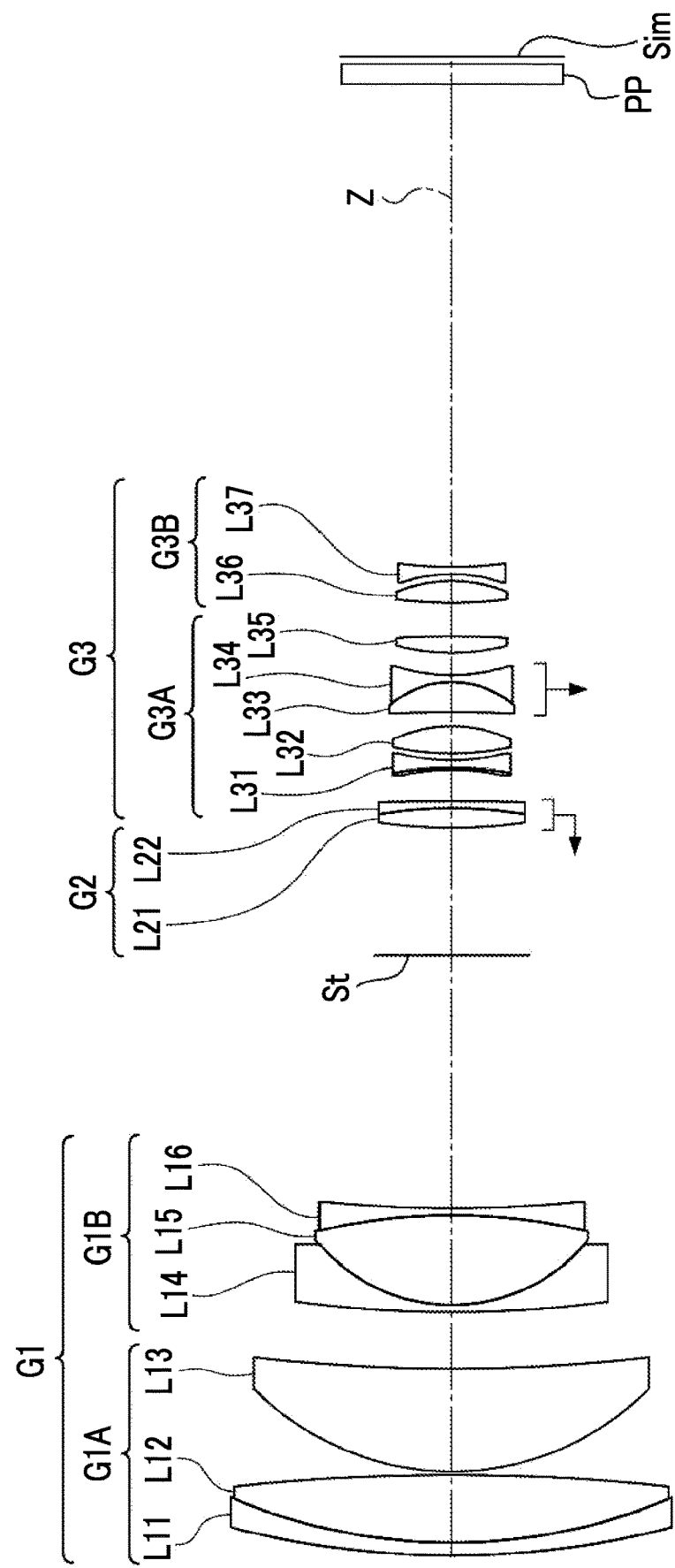
FIG. 14 is a cross-sectional view showing a configuration of an imaging lens of Example 7.

FIG. 14 is a cross-sectional view of a configuration of the imaging lens of Example 7. The imaging lens of Example 7 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A consists of lenses L11 to L13, in order from the object side to the image side. The first B lens group G1B consists of lenses L14 to L16, in order from the object side to the image side. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 and L37, in order from the object side to the image side. The lens L31 is a compound aspherical lens. The vibration-proof group consists of lenses L33 and L34.

Figure 15:
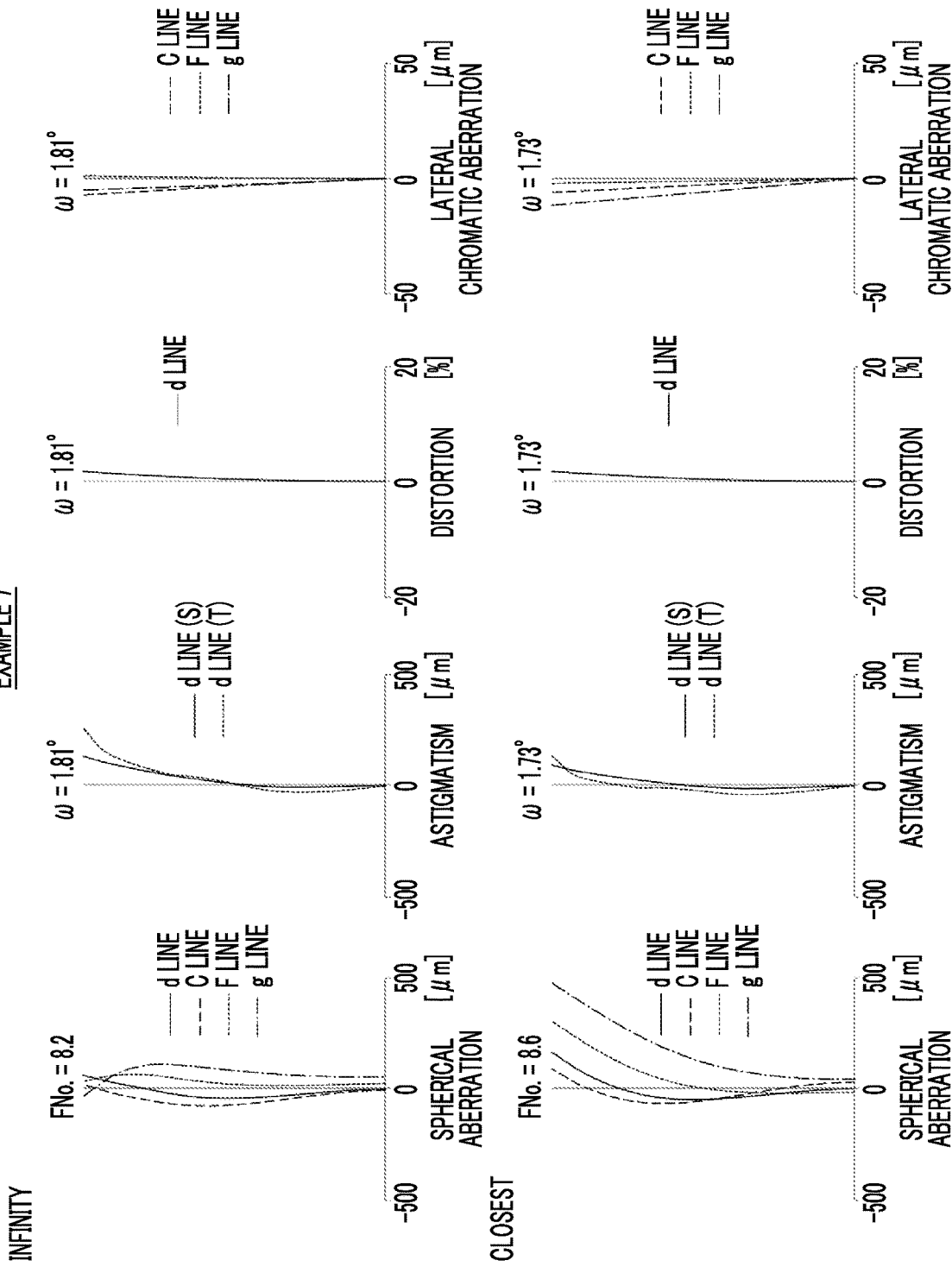
FIG. 15 is a diagram showing aberrations of the imaging lens of Example 7.

Regarding the imaging lens of Example 7, Table 19 shows basic lens data, Table 20 shows specifications and variable surface spacings, and Table 21 shows aspherical coefficients thereof. FIG. 15 shows aberration diagrams. In FIG. 15, the upper part shows aberration diagrams in a state in which the infinite distance object is in focus, and the lower part shows aberration diagrams in the state in which the closest range object is in focus. In the imaging lens of Example 7, the distance on the optical axis between the object and the image plane Sim in the state in which the closest range object is in focus is 3.3 m (meters).

TABLE 19

| Sn | R | D | Nd | υd | θgF | Material |
|---|---|---|---|---|---|---|
| 1 | 121.24923 | 1.800 | 1.91082 | 35.25 | 0.58224 | TAFD35.HOYA |
| 2 | 78.28666 | 9.430 | 1.64769 | 33.79 | 0.59393 | S-TIM22.OHARA |
| 3 | −289.02339 | 0.500 | | | | |
| 4 | 38.28378 | 14.492 | 1.43875 | 94.66 | 0.53402 | S-FPL55.OHARA |
| 5 | 246.34508 | 7.928 | | | | |
| 6 | 164.06147 | 1.000 | 1.80420 | 46.50 | 0.55799 | TAF3.HOYA |
| 7 | 24.44242 | 12.540 | 1.49700 | 81.54 | 0.53748 | S-FPL51.OHARA |
| 8 | −80.92733 | 1.000 | 1.90366 | 31.34 | 0.59636 | S-LAH95.OHARA |
| 9 | 176.95895 | 35.332 | | | | |
| 10(St) | ∞ | DD[10] | | | | |
| 11 | 66.00793 | 2.780 | 1.53359 | 55.47 | 0.54898 | H-K12.CDGM |
| 12 | −63.13454 | 1.000 | 1.65113 | 55.89 | 0.54754 | H-LAK10.CDGM |
| 13 | −372.45451 | DD[13] | | | | |
| *14 | −31.76844 | 0.250 | 1.59833 | 20.31 | 0.83392 | |
| 15 | −47.20192 | 1.000 | 1.88300 | 39.22 | 0.57288 | H-ZLAF68N.CDGM |
| 16 | 28.25716 | 1.019 | | | | |
| 17 | 39.80461 | 3.771 | 1.62588 | 35.74 | 0.58780 | E-F1.HOYA |
| 18 | −19.42901 | 2.000 | | | | |
| 19 | −213.17685 | 4.216 | 1.64769 | 33.82 | 0.59506 | N-SF2.SCH0TT |
| 20 | −13.26079 | 1.000 | 1.67790 | 54.90 | 0.54525 | D-L.AK5.CDGM |
| *21 | 24.92319 | 3.129 | | | | |
| 22 | 30.02040 | 2.275 | 1.59551 | 39.23 | 0.58053 | H-QF14.CDGM |
| 23 | −133.93389 | 4.775 | | | | |
| 24 | 68.44847 | 3.020 | 1.59551 | 39.23 | 0.58053 | H-QF14.CDGM |
| 25 | −20.86447 | 1.000 | | | | |
| *26 | −20.85168 | 1.000 | 1.88202 | 37.22 | 0.57699 | M-TAFD3Q7.HOYA |
| *27 | 62.02351 | 67.563 | | | | |
| 28 | ∞ | 2.850 | 1.51680 | 64.20 | 0.53430 | BSC7.HOYA |
| 29 | ∞ | 1.065 | | | | |

TABLE 20

| | Infinity | Closest |
|---|---|---|
| f | 485.248 | 288.647 |
| Bf | 70.506 | 70.506 |
| FNo. | 8.2 | 8.6 |
| 2ω(°) | 3.62 | 3.46 |
| DD[10] | 17.899 | 8.269 |
| DD[13] | 4.412 | 14.042 |

TABLE 21

| Sn | 14 | 21 | 26 | 27 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −8.8206546E−06 | −1.0049353E−05 | 1.0403441E−05 | 5.5180875E−06 |
| A5 | −1.8409472E−08 | −1.4687945E−07 | −2.9249001E−07 | 6.1674693E−07 |
| A6 | 1.4159901E−08 | −4.4333846E−08 | 4.4450908E−08 | −1.1720565E−08 |
| A7 | 1.0050774E−09 | 2.0885743E−09 | 8.3726727E−09 | −2.8794138E−09 |
| A8 | 5.5989696E−11 | 4.2207661E−10 | 6.9806341E−10 | 1.4226458E−10 |
| A9 | 9.9807842E−13 | 7.3422866E−11 | −2.8987344E−11 | 1.3087929E−10 |
| A10 | −5.7167861E−13 | 9.6178482E−12 | −3.1117767E−11 | 3.7879211E−11 |
| A11 | −1.6119275E−13 | −4.1065094E−12 | −2.9268234E−12 | 4.4344280E−12 |
| A12 | −1.4036792E−14 | 2.1192318E−13 | 8.3619775E−13 | −1.2760516E−12 |
| A13 | 4.5771076E−15 | −7.1032452E−14 | 9.6122885E−I4 | −2.0157146E−13 |
| A14 | −3.7231498E−17 | 7.2235632E−15 | −2.1421988E−I4 | 1.2507055E−14 |
| A15 | −9.3243758E−17 | 1.9024575E−16 | −1.1197836E−15 | 5.2195876E−16 |

TABLE 21-continued

| Sn | 14 | 21 | 26 | 27 |
|---|---|---|---|---|
| A16 | 9.9523680E−18 | −2.2213663E−17 | −6.7394808E−17 | 8.6911757E−17 |
| A17 | −1.7073160E−19 | 3.6543837E−18 | −1.1766286E−18 | −1.0357945E−17 |
| A18 | −2.9233071E−20 | −3.0021422E−19 | 5.5866148E−20 | −4.8578985E−20 |
| A19 | −2.3459313E−21 | −1.6558874E−21 | 3.9325286E−21 | −7.2196161E−20 |
| A20 | 2.9645619E−23 | 3.8709612E−23 | 6.1902318E−21 | −3.7002064E−20 |

Example 8

Figure 16:
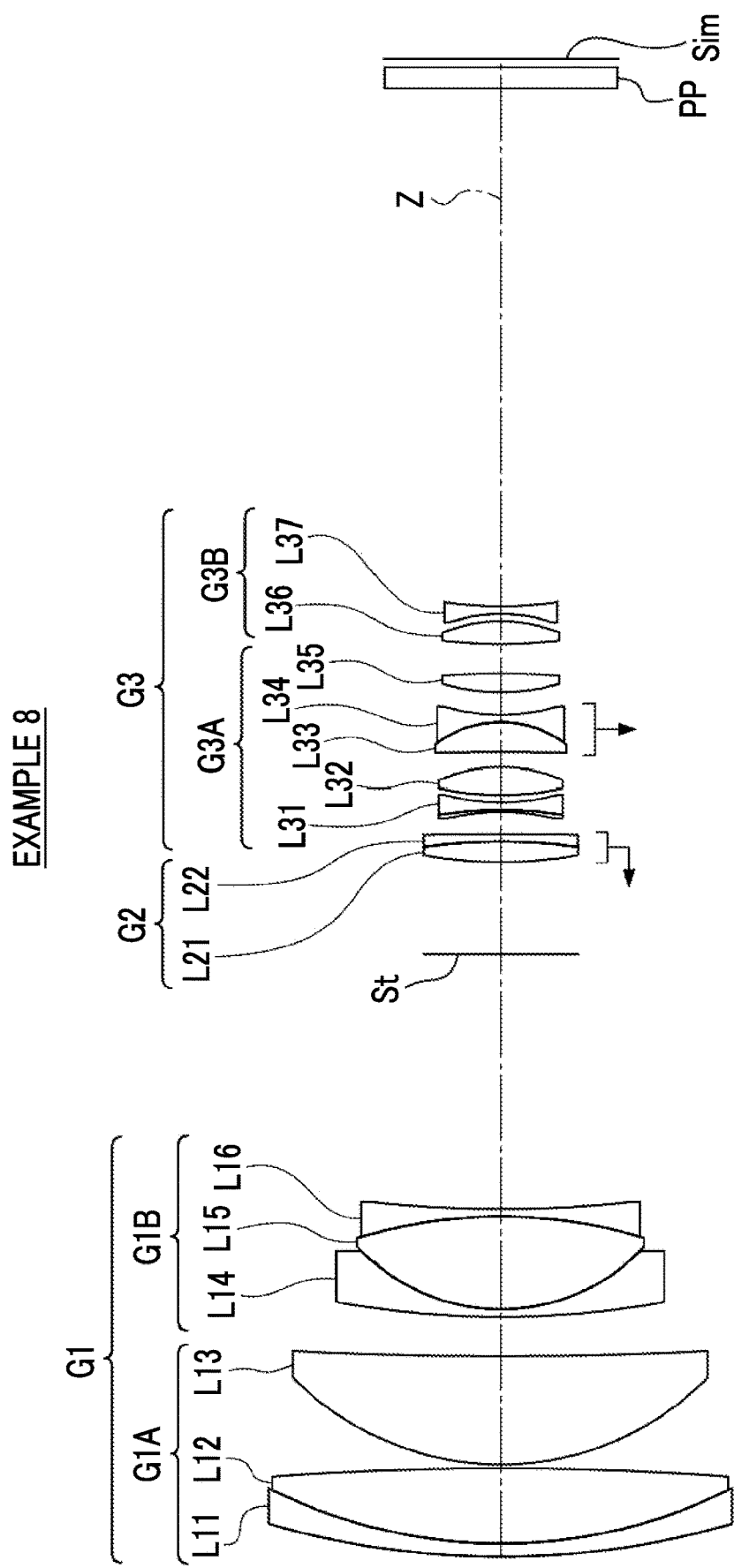
FIG. 16 is a cross-sectional view showing a configuration of an imaging lens of Example 8.

FIG. 16 is a cross-sectional view of a configuration of the imaging lens of Example 8. The imaging lens of Example 8 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A consists of lenses L11 to L13, in order from the object side to the image side. The first B lens group G1B consists of lenses L14 to L16, in order from the object side to the image side. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 and L37, in order from the object side to the image side. The lens L31 is a compound aspherical lens. The vibration-proof group consists of lenses L33 and L34.

Figure 17:
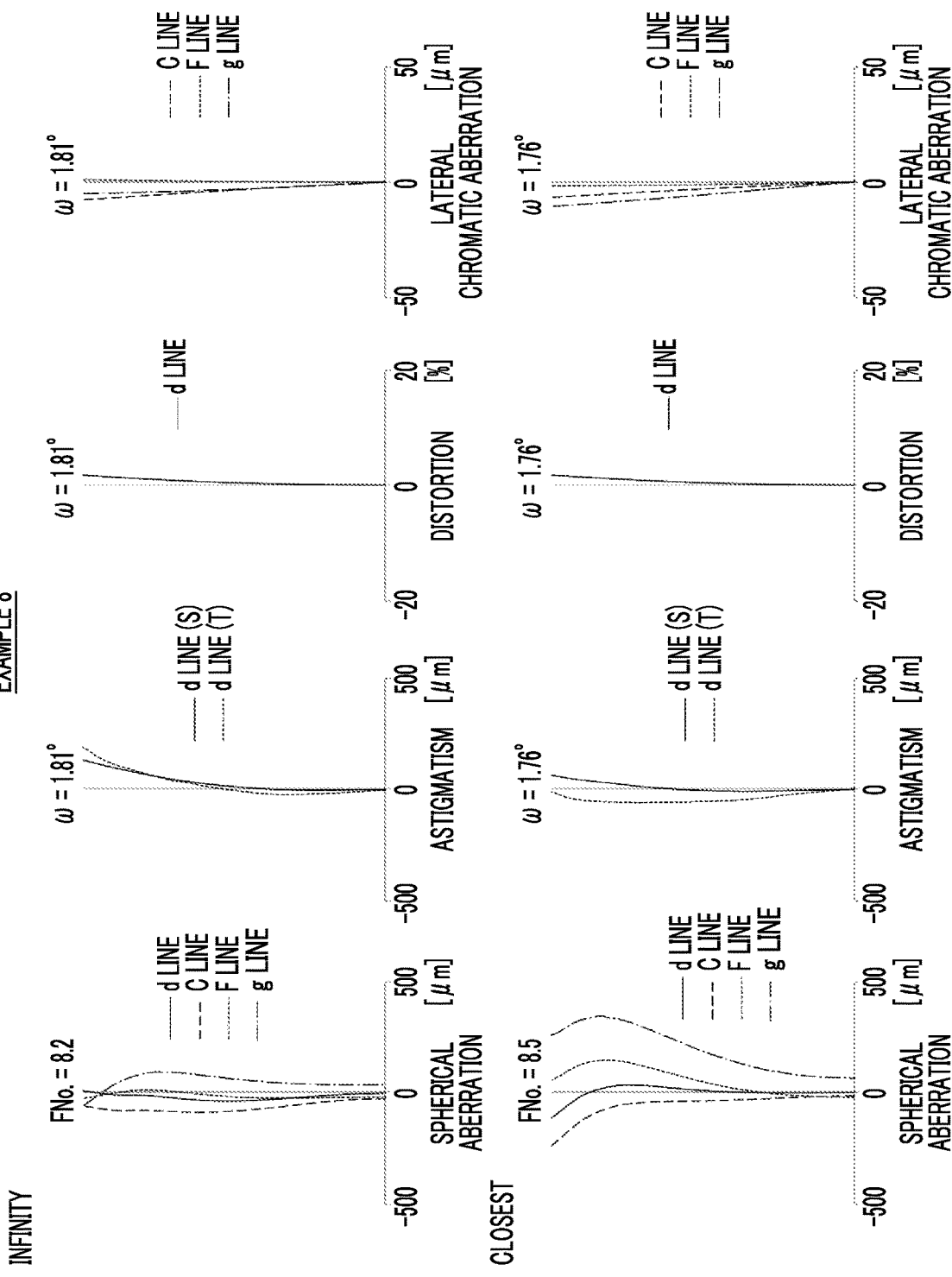
FIG. 17 is a diagram showing aberrations of the imaging lens of Example 8.

Regarding the imaging lens of Example 8, Table 22 shows basic lens data, Table 23 shows specifications and variable surface spacings, and Table 24 shows aspherical coefficients thereof. FIG. 17 shows aberration diagrams. In FIG. 17, the upper part shows aberration diagrams in a state in which the infinite distance object is in focus, and the lower part shows aberration diagrams in the state in which the closest range object is in focus. In the imaging lens of Example 8, the distance on the optical axis between the object and the image plane Sim in the state in which the closest range object is in focus is 4.8 m (meters).

TABLE 22

| Sn | R | D | Nd | υd | θgF | Material |
|---|---|---|---|---|---|---|
| 1 | 108.71518 | 1.800 | 1.90043 | 37.37 | 0.57720 | TAFD37.HOYA |
| 2 | 68.14982 | 9.988 | 1.67270 | 32.17 | 0.59633 | E-FD5.HOYA |
| 3 | −407.93260 | 0.500 | | | | |
| 4 | 38.26411 | 14.515 | 1.43875 | 94.66 | 0.53402 | S-FPL55.OHARA |
| 5 | 547.61317 | 5.297 | | | | |
| 6 | 122.60621 | 1.000 | 1.78800 | 47.52 | 0.55545 | H-LAF1OLA.CDGM |
| 7 | 25.93859 | 12.335 | 1.49700 | 81.54 | 0.53748 | S-FPL51.OHARA |
| 8 | −64.96066 | 1.000 | 1.95001 | 29.37 | 0.59972 | H-ZLAF75.NHG |
| 9 | 156.23610 | 34.068 | | | | |
| 10(St) | ∞ | DD[10] | | | | |
| 11 | 57.36073 | 2.735 | 1.58267 | 46.48 | 0.56631 | J-BAF3.HIKARI |
| 12 | −72.56969 | 1.000 | 1.83481 | 42.74 | 0.56453 | H-ZLAF55C.CDGM |
| 13 | −720.65447 | DD[13] | | | | |
| *14 | −29.78862 | 0.250 | 1.59833 | 20.31 | 0.83392 | |
| 15 | −55.58265 | 1.000 | 1.95375 | 32.32 | 0.59015 | TAFD45.HOYA |
| 16 | 28.09685 | 1.000 | | | | |
| 17 | 41.13740 | 3.556 | 1.69895 | 30.05 | 0.60174 | H-ZF11.CDGM |
| 18 | −21.38306 | 2.000 | | | | |
| 19 | −443.42029 | 3.977 | 1.75521 | 27.55 | 0.60878 | H-ZF6.CDGM |
| 20 | −14.37076 | 1.000 | 1.80139 | 45.45 | 0.55814 | M-TAF31.HOYA |
| *21 | 25.74550 | 3.038 | | | | |
| 22 | 27.56668 | 2.516 | 1.58144 | 40.91 | 0.57604 | H-QF50.CDGM |
| 23 | −82.15952 | 3.932 | | | | |
| 24 | 67.13486 | 3.039 | 1.58144 | 40.91 | 0.57604 | H-QF50.CDGM |
| 25 | −20.74090 | 1.000 | | | | |
| *26 | −20.47930 | 1.000 | 1.85060 | 41.62 | 0.56454 | K-VC99.SUMITA |
| *27 | 49.76156 | 69.246 | | | | |
| 28 | ∞ | 2.850 | 1.51680 | 64.20 | 0.53430 | BSC7.HOYA |
| 29 | ∞ | 1.091 | | | | |

TABLE 23

|      | Infinity | Closest |
|------|----------|---------|
| f    | 485.424  | 327.698 |
| Bf   | 72.216   | 72.216  |
| FNo. | 8.2      | 8.5     |
| 2ω(°)| 3.62     | 3.52    |
| DD[10]| 12.352  | 6.346   |
| DD[13]| 2.991   | 8.997   |

TABLE 24

| Sn  | 14 | 21 | 26 | 27 |
|-----|----|----|----|----|
| KA  | 1.0000000E+00 | 1.0000000E+00 | 1.0000000E+00 | 1.0000000E+00 |
| A3  | 0.0000000E+00 | 0.0000000E+00 | 0.0000000E+00 | 0.0000000E+00 |
| A4  | −1.5704050E−06 | −9.6203281E−06 | 1.0310189E−05 | 7.0422621E−06 |
| A5  | −9.2583423E−08 | −1.9180321E−07 | −1.8240431E−07 | 5.0217044E−07 |
| A6  | 3.9086708E−09 | −3.1344499E−08 | 3.4291129E−08 | −8.4240996E−09 |
| A7  | 7.5398984E−12 | 3.0884200E−09 | 5.3325012E−09 | −1.1770228E−09 |
| A8  | 2.2444780E−12 | 1.9697389E−10 | 4.2691482E−10 | 2.4852817E−10 |
| A9  | 2.6109500E−12 | 4.3491299E−12 | −1.4967131E−11 | 1.1350518E−10 |
| A10 | 6.8526593E−13 | −3.2148337E−13 | −1.2868766E−11 | 3.0199642E−11 |
| A11 | 9.8509472E−14 | −4.0342024E−12 | −1.1747688E−12 | −3.5827315E−13 |
| A12 | 1.0153588E−14 | 4.4042724E−13 | 5.3742221E−13 | −5.0024502E−13 |
| A13 | 1.6704110E−15 | −2.7897312E−14 | −4.8603711E−14 | −9.7646075E−14 |
| A14 | −9.8842562E−16 | 5.6927935E−15 | −3.1218404E−15 | 6.4785112E−15 |
| A15 | 6.3155533E−17 | −1.9705658E−17 | −1.9608491E−16 | −3.6236163E−16 |
| A16 | −3.9268844E−19 | −5.2788335E−17 | −3.3958260E−17 | 6.5993904E−17 |
| A17 | 2.5842320E−19 | 3.8545797E−18 | −1.5044075E−18 | −3.2713273E−18 |
| A18 | −2.8511867E−20 | −2.6086205E−19 | −3.0803645E−20 | 1.4692568E−19 |
| A19 | −8.4187914E−22 | −1.7787196E−21 | −6.9018426E−21 | −8.2082373E−21 |
| A20 | −2.7180669E−23 | −1.2031867E−22 | −3.4514917E−21 | −1.9813269E−20 |

Example 9

Figure 18:
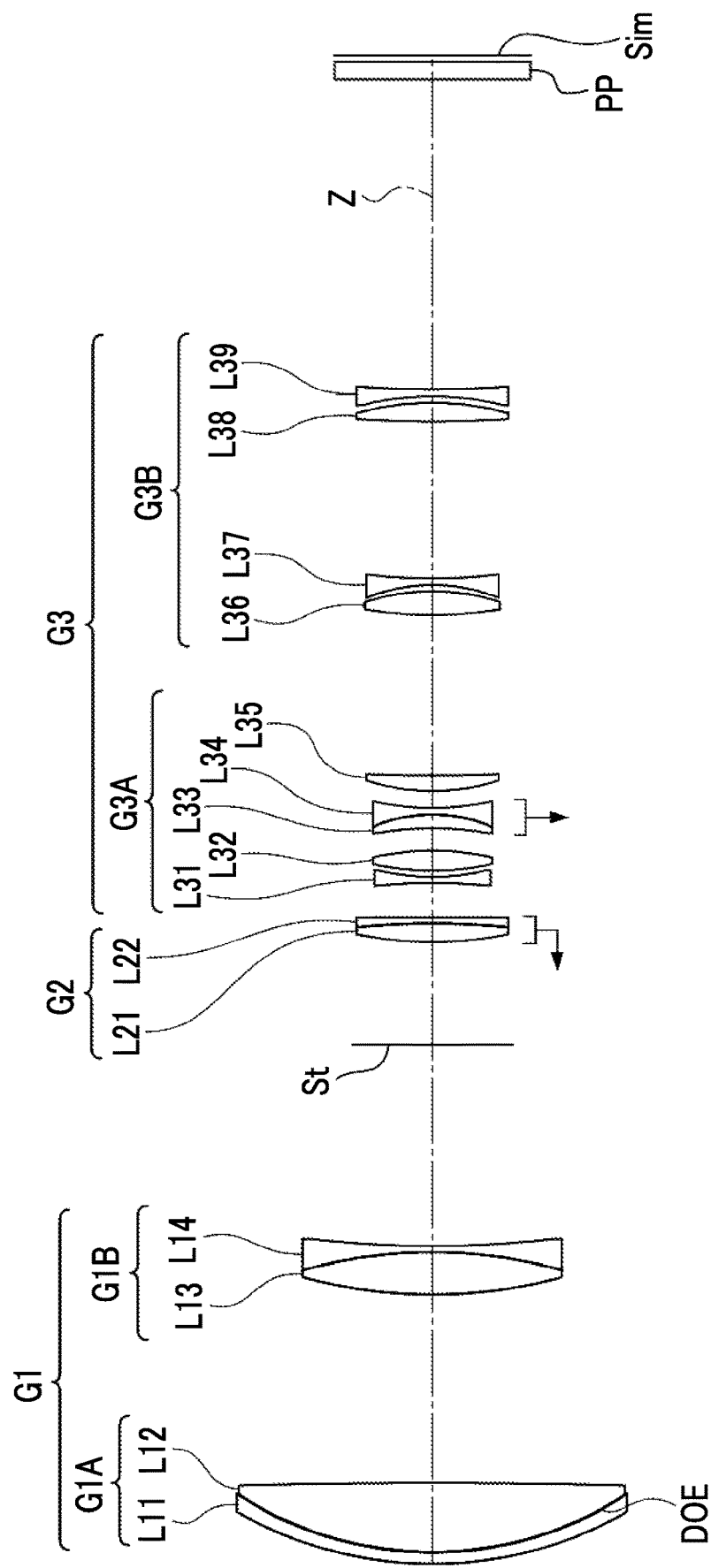
FIG. 18 is a cross-sectional view showing a configuration of an imaging lens of Example 9.

FIG. 18 is a cross-sectional view of a configuration of the imaging lens of Example 9. The imaging lens of Example 9 consists of, in order from the object side to the image side along the optical axis Z, a first lens group G1 having a positive refractive power, an aperture stop St, a second lens group G2 having a positive refractive power, and a third lens group G3 having a negative refractive power. During focusing from the infinite distance object to the closest range object, the second lens group G2 moves toward the object side, and the first lens group G1 and the third lens group G3 remain stationary with respect to the image plane Sim.

The first lens group G1 consists of a first A lens group G1A and a first B lens group G1B, in order from the object side to the image side. The first A lens group G1A includes lenses L11 and L12, in order from the object side to the image side. Further, the first A lens group G1A includes a diffractive optical surface DOE. The first B lens group G1B consists of lenses L13 and L14, in order from the object side to the image side. The second lens group G2 consists of lenses L21 and L22, in order from the object side to the image side. The third lens group G3 consists of a third A lens group G3A and a third B lens group G3B, in order from the object side to the image side. The third A lens group G3A consists of lenses L31 to L35, in order from the object side to the image side. The third B lens group G3B consists of lenses L36 to L39, in order from the object side to the image side. The vibration-proof group consists of lenses L33 and L34.

Figure 19:
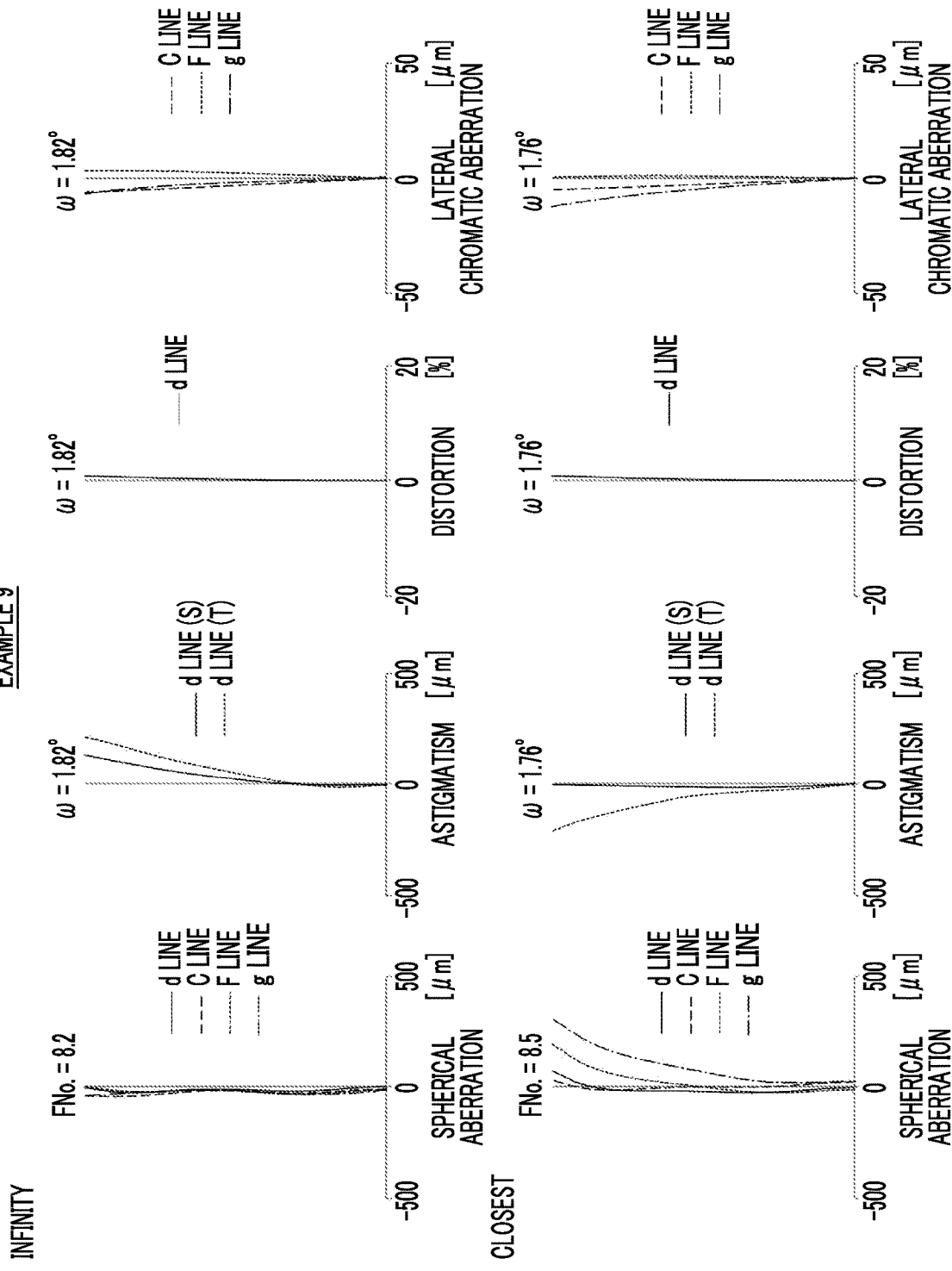
FIG. 19 is a diagram showing aberrations of the imaging lens of Example 9.

Regarding the imaging lens of Example 9, Table 25 shows basic lens data, Table 26 shows specifications and variable surface spacings, Table 27 shows aspherical coefficients thereof, and Table 28 shows phase difference coefficients. FIG. 19 shows aberration diagrams. In FIG. 19, the upper part shows aberration diagrams in a state in which the infinite distance object is in focus, and the lower part shows aberration diagrams in the state in which the closest range object is in focus. In the imaging lens of Example 9, the distance on the optical axis between the object and the image plane Sim in the state in which the closest range object is in focus is 3.3 m (meters).

In Table 25, the surface numbers of the diffractive optical surface DOE are marked with #. In Table 28, the column of Sn shows the surface number of the diffractive optical surface DOE, and the rows of B2, B4, B6, B8, and B10 show numerical values of the phase difference coefficient of the diffractive optical surface DOE. The "E-n" (n: an integer) in numerical values of the phase difference coefficients of Table 28 indicates "×10$^{-n}$". The shape of the diffractive optical surface DOE is determined by the phase difference function Φ(h) described below. B2, B4, B6, B8, and B10 are the phase difference coefficients in the phase difference function Φ(h) of the following expression. H in the following expression is a height from the optical axis Z.

$$\Phi(h) = B2 \times h^2 + B4 \times h^4 + B6 \times h^6 + B8 \times h^8 + B10 \times h^{10}$$

TABLE 25

| Sn | R | D | Nd | υd | θgF | Material |
|---|---|---|---|---|---|---|
| 1 | 61.49067 | 1.800 | 1.81600 | 46.62 | 0.55682 | S-LAH59.OHARA |
| 2 | 55.80421 | 0.090 | 1.58900 | 46.75 | 0.55536 | |
| #3 | 55.80421 | 0.004 | 1.53210 | 18.35 | 0.42929 | |
| 4 | 55.80421 | 10.936 | 1.49967 | 62.09 | 0.54042 | H-K1.CDGM |
| 5 | −1188.15100 | 30.079 | | | | |
| 6 | 77.17128 | 6.662 | 1.51633 | 64.14 | 0.53531 | S-BSL7.OHARA |
| 7 | −77.34012 | 1.021 | 1.90043 | 37.37 | 0.57668 | TAFD37A.HOYA |
| 8 | 165.29135 | 31.916 | | | | |
| 9(St) | ∞ | DD[9] | | | | |
| 10 | 57.51288 | 2.969 | 1.51742 | 52.19 | 0.55915 | H-KF6.CDGM |
| 11 | −113.20923 | 1.030 | 1.89190 | 37.13 | 0.57813 | S-LAH92.OHARA |
| 12 | −870.02523 | DD[12] | | | | |
| 13 | −94.46256 | 1.000 | 2.00100 | 29.13 | 0.59952 | TAFD55-W.HOYA |
| 14 | 35.95533 | 1.000 | | | | |
| 15 | 43.62998 | 3.179 | 1.61293 | 36.94 | 0.58634 | J-F3.HIKARI |
| 16 | −42.46445 | 3.547 | | | | |
| 17 | −52.75569 | 2.238 | 2.00171 | 20.66 | 0.63472 | K-PSFN2.SUMITA |
| 18 | −23.12430 | 1.010 | 1.85223 | 40j2 | 0.56991 | D-ZLAF85A.CDGM |
| *19 | 41.48445 | 2.733 | | | | |
| 20 | 34.20320 | 2.506 | 1.56732 | 42.81 | 0.57494 | H-QF56.CDGM |
| 21 | 279.99314 | 25.502 | | | | |
| 22 | 61.06200 | 3.792 | 1.67270 | 32j7 | 0.59633 | E-FD5.HOYA |
| 23 | −34.17627 | 1.000 | | | | |
| *24 | −27.18132 | 1.000 | 1.62087 | 63.83 | 0.54330 | D-ZPK1A.CDGM |
| *25 | 91.10958 | 25.000 | | | | |
| 26 | 180.38602 | 3.000 | 1.84667 | 23.79 | 0.62050 | H-ZF52A.CDGM |
| 27 | −44.19895 | 1.000 | | | | |
| 28 | −46.77860 | 1.000 | 1.94595 | 17.98 | 0.65460 | FDS18-W.HOYA |
| 29 | 171.60057 | 49.355 | | | | |
| 30 | ∞ | 2.850 | 1.51680 | 64.20 | 0.53430 | BSC7.HOYA |
| 31 | ∞ | 1.020 | | | | |

TABLE 26

| | Infinity | Closest |
|---|---|---|
| f | 484.955 | 316.427 |
| Bf | 52.254 | 52.254 |
| FNo. | 8.2 | 8.5 |
| 2ω(°) | 3.64 | 3.52 |
| DD[9] | 16.323 | 7.848 |
| DD[12] | 5.433 | 13.908 |

TABLE 27

| Sn | 19 | 24 | 25 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −2.9383239E−06 | 5.2028499E−06 | 4.9571136E−06 |
| A5 | 1.1677122E−07 | 6.6620821E−07 | 9.6100728E−07 |
| A6 | −1.0146721E−08 | 2.3808096E−08 | −1.6211320E−08 |
| A7 | 1.8891223E−10 | −9.0356847E−09 | −1.1285878E−08 |
| A8 | −5.1404532E−10 | −8.1814077E−10 | −3.0518778E−10 |
| A9 | 2.6421485E−11 | −1.7365991E−11 | 7.1922280E−11 |
| A10 | 3.5902812E−12 | 7.2635001E−12 | −3.5875023E−12 |
| A11 | 1.7046343E−12 | 1.5426732E−12 | 5.3343810E−13 |
| A12 | −7.7225814E−14 | −3.5608766E−14 | −5.6387570E−15 |
| A13 | −3.8347620E−14 | −2.2649831E−14 | 2.2100504E−16 |
| A14 | 1.0070543E−15 | 1.6905268E−15 | 1.8708202E−16 |
| A15 | −5.8752986E−18 | −2.1411205E−17 | −2.0953341E−17 |
| A16 | 6.2522437E−17 | −3.0576723E−18 | −2.0090399E−18 |
| A17 | −2.7977989E−18 | 5.8150831E−19 | −1.0935341E−18 |
| A18 | −2.0732269E−19 | −4.5869471E−20 | 2.0673252E−19 |
| A19 | −1.4127159E−20 | 1.6746019E−21 | −6.9381602E−21 |
| A20 | 1.8528657E−21 | −6.8040754E−23 | −1.7698754E−22 |

TABLE 28

| Sn | 3 |
|---|---|
| B2 | −3.17666E−01 |
| B4 | −8.42223E−06 |
| B6 | −1.03870E−08 |
| B8 | −3.91018E−12 |
| B10 | −1.80714E−15 |

Table 29 and Table 30 each show the corresponding values of Conditional Expressions (1) to (30) of the imaging lenses of Examples 1 to 9.

TABLE 29

| Expression Number | | Example 1 | Example 2 | Example 3 | Example 4 | Example 5 |
|---|---|---|---|---|---|---|
| (1) | TL/f | 0.617 | 0.575 | 0.534 | 0.514 | 0.494 |
| (2) | f/f1 | 1.772 | 1.992 | 2.400 | 2.579 | 2.722 |
| (3) | ω | 1.68 | 1.68 | 1.68 | 1.68 | 1.68 |
| (4) | dDOE/TL | — | — | — | — | — |
| (5) | f/f2 | 3.314 | 3.154 | 2.926 | 2.909 | 3.024 |
| (6) | f/f3 | −7.334 | −7.746 | −10.176 | −11.220 | −12.106 |
| (7) | Δd/TL | 0.0077 | 0.0087 | 0.0109 | 0.0121 | 0.1990 |
| (8) | dSpmax/TL | 0.172 | 0.197 | 0.152 | 0.149 | 0.365 |

TABLE 29-continued

| Expression Number | | Example 1 | Example 2 | Example 3 | Example 4 | Example 5 |
|---|---|---|---|---|---|---|
| (9) | dair/TL | 0.082 | 0.095 | 0.080 | 0.062 | 0.044 |
| (10) | f1A/f1B | −0.939 | −0.848 | −0.862 | −0.882 | −0.935 |
| (11) | υ1Bp | 81.54 | 81.54 | 81.54 | 81.54 | 81.54 |
| (12) | f3A/f3B | 0.241 | −0.016 | 0.207 | 0.356 | 0.282 |
| (13) | f/|fis| | 9.090 | 11.345 | 13.413 | 13.224 | 14.086 |
| (14) | f/fr | 6.698 | 6.804 | 9.064 | 9.871 | 8.704 |
| (15) | N3Cn | 1.90366 | 1.95000 | 2.01960 | 2.01960 | 2.01960 |
| (16) | N3p-N3n | 0.281 | 0.281 | 0.164 | 0.164 | 0.164 |
| (17) | V3p-V3n | −28.26 | −28.26 | −18.43 | −18.43 | −18.43 |
| (18) | θ3p-θ3n | 0.037 | 0.037 | 0.035 | 0.035 | 0.035 |
| (19) | N2p-N2n | −0.230 | −0.230 | −0.268 | −0.268 | −0.268 |
| (20) | V2p-V2n | 8.74 | 8.75 | 2.78 | 2.78 | 2.78 |
| (21) | θ2p-θ2n | −0.007 | −0.010 | 0.002 | 0.002 | 0.002 |
| (22) | Bf/(f × tanω) | 4.496 | 2.642 | 5.228 | 5.228 | 5.435 |
| (23) | f/FNo | 58.842 | 58.842 | 58.839 | 58.833 | 58.827 |
| (24) | N1p-N1n | — | — | 0.167 | 0.167 | 0.167 |
| (25) | υ1p-υ1n | — | — | −24.77 | −24.77 | −24.77 |
| (26) | θ1p-θ1n | — | — | 0.044 | 0.044 | 0.044 |
| (27) | υ1Sp | 94.66 | 94.66 | 94.66 | 94.66 | 94.66 |
| (28) | υ1pp | 94.66 | 94.66 | — | — | — |
| (29) | Sg | 3.59 | 3.59 | — | — | — |
| (30) | dHAS/TL | — | — | — | — | — |

TABLE 30

| Expression Number | | Example 6 | Example 7 | Example 8 | Example 9 |
|---|---|---|---|---|---|
| (1) | TL/f | 0.493 | 0.435 | 0.414 | 0.495 |
| (2) | f/ft | 2.763 | 2.619 | 3.089 | 2.994 |
| (3) | ω | 1.68 | 1.68 | 1.68 | 1.68 |
| (4) | dDOE/TL | — | — | — | 0.290 |
| (5) | f/f2 | 2.658 | 3.863 | 3.822 | 3.283 |
| (6) | f/f3 | −12.525 | −15.937 | −18.473 | −13.749 |
| (7) | Δd/TL | 0.1676 | 0.0478 | 0.0200 | 0.1323 |
| (8) | dSpmax/TL | 0.329 | 0.136 | 0.135 | 0.285 |
| (9) | dair/TL | 0.031 | 0.035 | 0.025 | 0.125 |
| (10) | f1A/ftB | −0.812 | −1.151 | −1.082 | −0.425 |
| (11) | υ1Bp | 81.54 | 81.54 | 81.54 | 64.14 |
| (12) | f3A/f3B | 0.528 | 1.922 | 2.008 | −0.048 |
| (13) | f/|fis| | 13.424 | 15.923 | 17.590 | 16.279 |
| (14) | f/fr | 8.455 | 11.716 | 13.55 | 7.124 |
| (15) | N3Cn | 2.01960 | 1.88300 | 1.95375 | 2.00100 |
| (16) | N3p-N3n | 0.132 | −0.030 | −0.046 | 0.149 |
| (17) | υ3p-υ3n | −17.38 | −21.08 | −17.90 | −19.46 |
| (18) | θ3p-θ3n | 0.034 | 0.050 | 0.051 | 0.065 |
| (19) | N2p-N2n | −0.254 | −0.118 | −0.252 | −0.374 |
| (20) | V2p-V2n | 1.55 | −0.42 | 3.74 | 15.06 |
| (21) | θ2p-θ2n | 0.006 | 0.001 | 0.002 | −0.019 |
| (22) | Bf/(fXtanω) | 5.597 | 4.962 | 5.082 | 3.678 |
| (23) | f/FNo | 58.850 | 58.859 | 58.874 | 58.873 |
| (24) | N1p-N1n | 0.006 | −0.263 | −0.228 | — |
| (25) | υ1p-υ1n | −16.61 | −1.46 | −5.20 | — |
| (26) | θ1p-θ1n | 0.047 | 0.012 | 0.019 | — |
| (27) | VISp | 94.66 | 94.66 | 94.66 | — |
| (28) | V1pp | — | — | — | — |
| (29) | Sg | — | — | — | — |
| (30) | dHAS/TL | 0.180 | — | — | — |

Although the imaging lenses of Examples 1 to 9 are telephoto lenses, the imaging lenses are reduced in size and weight, and various aberrations are satisfactorily corrected to realize high optical performance.

Figure 20:
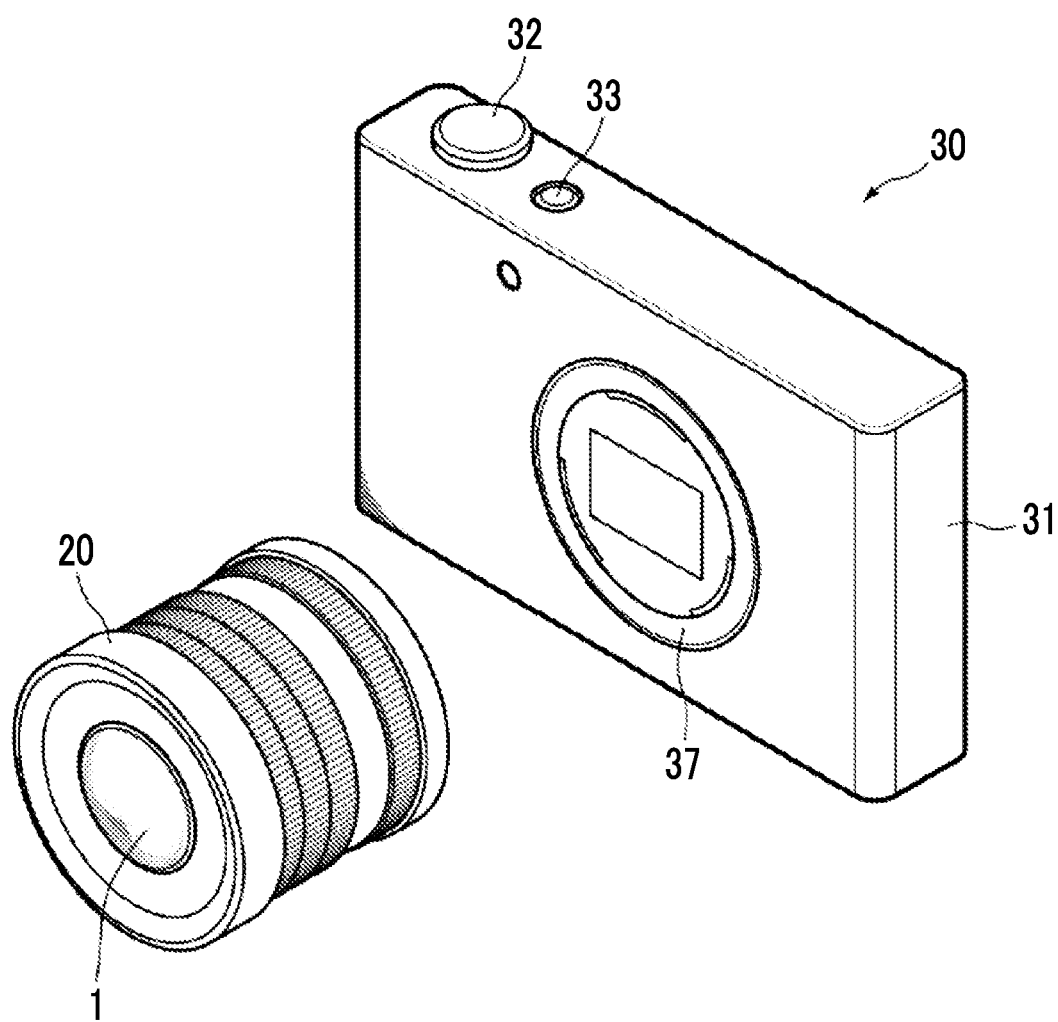
FIG. 20 is a perspective view of the front side of the imaging apparatus according to an embodiment.
Figure 21:
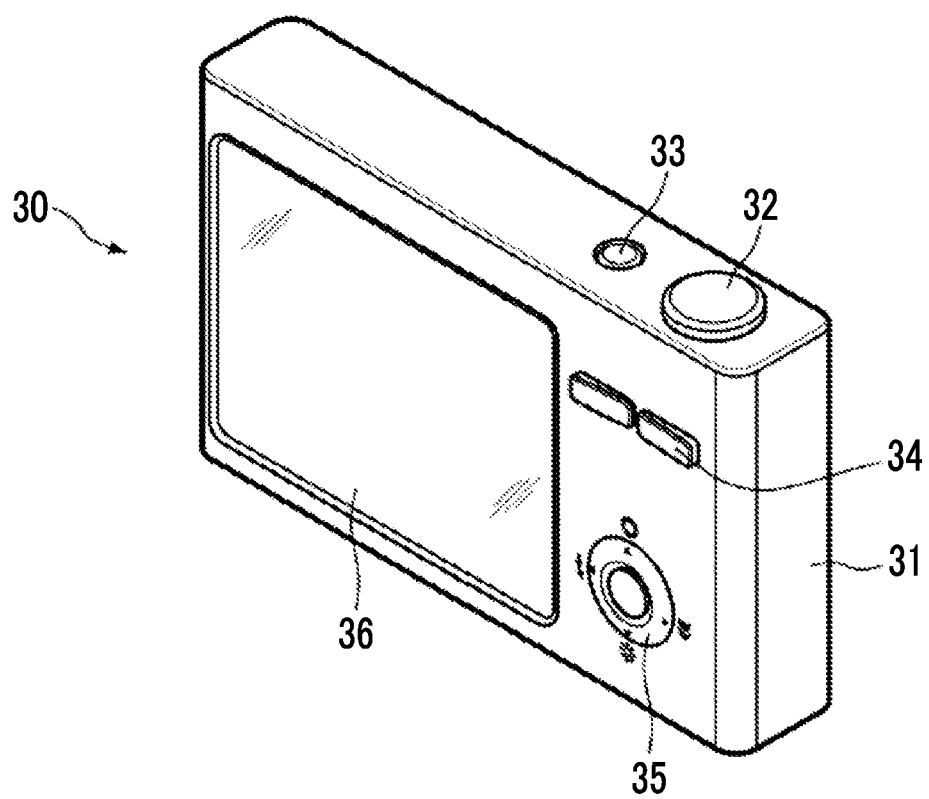
FIG. 21 is a perspective view of the rear side of the imaging apparatus according to the embodiment.

Next, an imaging apparatus according to an embodiment of the present disclosure will be described. FIGS. 20 and 21 are external views of a camera 30 which is the imaging apparatus according to the embodiment of the present disclosure. FIG. 20 is a perspective view of the camera 30 viewed from a front side, and FIG. 21 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above-mentioned example, and may be modified into various forms such as a camera other than the mirrorless type, a film camera, and a video camera.

What is claimed is:

1. An imaging lens consisting of, in order from an object side to an image side: a first lens group that has a positive refractive power; a stop; a second lens group that has a positive refractive power; and a third lens group that has a negative refractive power,
   wherein during focusing, the first lens group and the third lens group remain stationary with respect to an image plane, and the second lens group moves along an optical axis,
   assuming that
   a sum of a distance on the optical axis from a lens surface closest to the object side in the first lens group to a lens surface closest to the image side in the third lens group and a back focal length of the imaging lens in terms of an air conversion distance is TL,
   a focal length of the imaging lens in a state in which an infinite distance object is in focus is f,
   a focal length of the first lens group is f1,
   a maximum half angle of view in a state in which the infinite distance object is in focus is ω, and
   a unit of ω is degree,
   Conditional Expressions (1), (2), and (3) are satisfied, which are represented by $$0<TL/f<0.64 \quad (1),$$

$$1.5<f/f1<5 \quad (2), \text{ and}$$

$$0<\omega<4 \quad (3),$$

wherein a cemented lens that consists of a negative lens and a positive lens is disposed closest to the object side in the first lens group, and
assuming that
a refractive index of the positive lens of the cemented lens at a d line is N1p, and
a refractive index of the negative lens of the cemented lens at the d line is N1n,
Conditional Expression (24) is satisfied, which is represented by $$-0.5<N1p-N1n<0.35 \quad (24).$$

2. The imaging lens according to claim 1,
wherein the first lens group includes a diffractive optical surface, and
assuming that a distance on the optical axis from the diffractive optical surface to the stop is dDOE, Conditional Expression (4) is satisfied, which is represented by $$0.1<dDOE/TL<0.5 \quad (4).$$

3. The imaging lens according to claim 1, wherein two or more positive lenses are continuously disposed in order from a position closest to the object side in the first lens group.

4. The imaging lens according to claim 1, wherein assuming that a focal length of the second lens group is f2, Conditional Expression (5) is satisfied, which is represented by $$0<f/f2<6 \quad (5).$$

5. The imaging lens according to claim 1, wherein assuming that a focal length of the third lens group is f3, Conditional Expression (6) is satisfied, which is represented by $$-30<f/f3<0 \quad (6).$$

6. The imaging lens according to claim 1, wherein assuming that a distance on the optical axis between an object side surface of a positive lens having a strongest refractive power among positive lenses disposed closer to the image side than the stop and an object side surface of a negative lens having a strongest refractive power among negative lenses disposed closer to the image side than the stop is Δd, Conditional Expression (7) is satisfied, which is represented by $$0<\Delta d/TL<0.3 \quad (7).$$

7. The imaging lens according to claim 1, wherein assuming that a distance on the optical axis from the stop to an object side surface of a positive lens having a strongest refractive power among positive lenses disposed closer to the image side than the stop is dSpmax, Conditional Expression (8) is satisfied, which is represented by $$0.05<dSp\,\text{max}/TL<0.6 \quad (8).$$

8. The imaging lens according to claim 1, wherein assuming that a longest air spacing on the optical axis in the first lens group is dair, Conditional Expression (9) is satisfied, which is represented by $$0.01<dair/TL<0.25 \quad (9).$$

9. The imaging lens according to claim 8,
wherein the first lens group consists of, in order from the object side to the image side, a first A lens group that has a positive refractive power and a first B lens group that has a negative refractive power and is separated from the first A lens group through the longest air spacing on the optical axis in the first lens group, and assuming that
- a focal length of the first A lens group is f1A, and
- a focal length of the first B lens group is f1B,
- Conditional Expression (10) is satisfied, which is represented by $$-2.5<f1A/f1B<0 \qquad (10).$$

10. The imaging lens according to claim 8,
wherein the first lens group consists of, in order from the object side to the image side, a first A lens group that has a positive refractive power and a first B lens group that has a negative refractive power and is separated from the first A lens group through the longest air spacing on the optical axis in the first lens group, and
the first B lens group includes a first lens pair consisting of a positive lens and a negative lens adjacent to each other, and
assuming that an Abbe number of the positive lens of the first lens pair based on a d line is ν1Bp, Conditional Expression (11) is satisfied, which is represented by $$40<\nu1Bp<100 \qquad (11).$$

11. The imaging lens according to claim 1,
wherein the third lens group consists of, in order from the object side to the image side, a third A lens group and a third B lens group that is separated from the third A lens group through a longest air spacing on the optical axis in the third lens group, and
assuming that
- a focal length of the third A lens group is f3A, and
- a focal length of the third B lens group is f3B,
- Conditional Expression (12) is satisfied, which is represented by $$-0.3<f3A/f3B<4 \qquad (12).$$

12. The imaging lens according to claim 11, wherein the third A lens group includes two or more negative lenses and two or more positive lenses.

13. The imaging lens according to claim 1,
wherein the third lens group includes a vibration-proof group that moves in a direction intersecting with the optical axis during image blur correction, and
assuming that a focal length of the vibration-proof group is fis, Conditional Expression (13) is satisfied, which is represented by $$2.5<f/|fis|<30 \qquad (13).$$

14. The imaging lens according to claim 13,
wherein the third lens group includes a rear group that has a positive refractive power closer to the image side than the vibration-proof group, and
assuming that a focal length of the rear group is fr, Conditional Expression (14) is satisfied, which is represented by $$2.5<f/fr<25 \qquad (14).$$

15. The imaging lens according to claim 13,
wherein in a case where one lens component is one single lens or one cemented lens, a lens component that has a negative refractive power is disposed between the second lens group and the vibration-proof group, and
assuming that a refractive index of a negative lens included in the lens component that has a negative refractive power at a d line is N3Cn, Conditional Expression (15) is satisfied, which is represented by $$1.75<N3Cn<2.2 \qquad (15).$$

16. The imaging lens according to claim 13,
wherein the vibration-proof group includes a second lens pair consisting of a positive lens and a negative lens adjacent to each other, and
assuming that
- a refractive index of the positive lens of the second lens pair at a d line is N3p,
- a refractive index of the negative lens of the second lens pair at the d line is N3n,
- an Abbe number of the positive lens of the second lens pair based on the d line is ν3p,
- an Abbe number of the negative lens of the second lens pair based on the d line is ν3n,
- a partial dispersion ratio of the positive lens of the second lens pair between a g line and an F line is θ3p, and
- a partial dispersion ratio of the negative lens of the second lens pair between the g line and the F line is θ3n,
- Conditional Expressions (16), (17), and (18) are satisfied, which are represented by $$-0.15<N3p-N3n<0.5 \qquad (16),$$

$$-40<\nu3p-\nu3n<-5 \qquad (17), \text{ and}$$

$$0<\theta3p-\theta3n<0.1 \qquad (18).$$

17. The imaging lens according to claim 1,
wherein the second lens group includes a third lens pair consisting of a positive lens and a negative lens adjacent to each other, and
assuming that
- a refractive index of the positive lens of the third lens pair at a d line is N2p,
- a refractive index of the negative lens of the third lens pair at the d line is N2n,
- an Abbe number of the positive lens of the third lens pair based on the d line is ν2p,
- an Abbe number of the negative lens of the third lens pair based on the d line is ν2n,
- a partial dispersion ratio of the positive lens of the third lens pair between a g line and an F line is θ2p, and
- a partial dispersion ratio of the negative lens of the third lens pair between the g line and the F line is θ2n,
- Conditional Expressions (19), (20), and (21) are satisfied, which are represented by $$-0.6<N2p-N2n<0 \qquad (19),$$

$$-10<\nu2p-\nu2n<30 \qquad (20), \text{ and}$$

$$-0.15<\theta2p-\theta2n<0.1 \qquad (21).$$

18. The imaging lens according to claim 1, wherein assuming that a back focal length of the imaging lens in terms of an air conversion distance is Bf, Conditional Expression (22) is satisfied, which is represented by $$1.5<Bf/(f\times\tan\omega)<10 \qquad (22).$$

19. The imaging lens according to claim 6, wherein Conditional Expression (7-1) is satisfied, which is represented by $$0<\Delta d/TL<0.25 \qquad (7-1).$$

20. An imaging apparatus comprising the imaging lens according to claim 1.

21. An imaging lens consisting of, in order from an object side to an image side: a first lens group that has a positive refractive power; a stop; a second lens group that has a positive refractive power; and a third lens group that has a negative refractive power,
- wherein during focusing, the first lens group and the third lens group remain stationary with respect to an image plane, and the second lens group moves along an optical axis,
- assuming that
  - a sum of a distance on the optical axis from a lens surface closest to the object side in the first lens group to a lens surface closest to the image side in the third lens group and a back focal length of the imaging lens in terms of an air conversion distance is TL,
  - a focal length of the imaging lens in a state in which an infinite distance object is in focus is f,
  - a focal length of the first lens group is f1,
  - a maximum half angle of view in a state in which the infinite distance object is in focus is ω, and
  - a unit of ω is degree,
  - Conditional Expressions (1), (2), and (3) are satisfied, which are represented by $$0 < TL/f < 0.64 \qquad (1),$$

$$1.5 < f/f1 < 5 \qquad (2), \text{ and}$$

$$0 < \omega < 4 \qquad (3),$$

- wherein a cemented lens that consists of a negative lens and a positive lens is disposed closest to the object side in the first lens group, and
- assuming that
  - an Abbe number of the positive lens of the cemented lens based on a d line is ν1p, and
  - an Abbe number of the negative lens of the cemented lens based on the d line is ν1n,
  - Conditional Expression (25) is satisfied, which is represented by $$-45 < \nu1p - \nu1n < 0 \qquad (25).$$

22. The imaging lens according to claim 1, wherein
assuming that
- a partial dispersion ratio of the positive lens of the cemented lens between a g line and an F line is θ1p, and
- a partial dispersion ratio of the negative lens of the cemented lens between the g line and the F line is θ1n,
- Conditional Expression (26) is satisfied, which is represented by $$0 < \theta1p - \theta1n < 0.15 \qquad (26).$$

23. An imaging lens consisting of, in order from an object side to an image side: a first lens group that has a positive refractive power; a stop; a second lens group that has a positive refractive power; and a third lens group that has a negative refractive power,
- wherein during focusing, the first lens group and the third lens group remain stationary with respect to an image plane, and the second lens group moves along an optical axis,
- assuming that
  - a sum of a distance on the optical axis from a lens surface closest to the object side in the first lens group to a lens surface closest to the image side in the third lens group and a back focal length of the imaging lens in terms of an air conversion distance is TL,
  - a focal length of the imaging lens in a state in which an infinite distance object is in focus is f,
  - a focal length of the first lens group is f1,
  - a maximum half angle of view in a state in which the infinite distance object is in focus is ω, and
  - a unit of ω is degree,
  - Conditional Expressions (1), (2), and (3) are satisfied, which are represented by $$0 < TL/f < 0.64 \qquad (1),$$

$$1.5 < f/f1 < 5 \qquad (2), \text{ and}$$

$$0 < \omega < 4 \qquad (3),$$

- wherein the first lens group includes a compound aspherical lens, and
- assuming that a distance on the optical axis from a surface, on which an aspherical surface of the compound aspherical lens is formed, to the stop is dHAS, Conditional Expression (30) is satisfied, which is represented by $$0.05 < dHAS/TL < 0.4 \qquad (30).$$

* * * * *